US011564101B2

(12) United States Patent
Fu et al.

(10) Patent No.: US 11,564,101 B2
(45) Date of Patent: Jan. 24, 2023

(54) METHOD AND SYSTEM FOR HANDLING NETWORK INTRUSION

(71) Applicant: Beijing Voyager Technology Co., Ltd., Beijing (CN)

(72) Inventors: Hao Fu, Mountain View, CA (US); Shray Kapoor, Mountain View, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 33 days.

(21) Appl. No.: 16/945,274

(22) Filed: Jul. 31, 2020

(65) Prior Publication Data

US 2022/0038903 A1 Feb. 3, 2022

(51) Int. Cl.
*H04W 4/44* (2018.01)
*H04W 12/121* (2021.01)
(Continued)

(52) U.S. Cl.
CPC ....... *H04W 12/121* (2021.01); *H04W 12/088* (2021.01); *H04W 12/106* (2021.01)

(58) Field of Classification Search
CPC ........ G16Y 30/10; G16Y 40/10; G16Y 40/50; H04W 24/08; H04W 24/00;
(Continued)

(56) References Cited

U.S. PATENT DOCUMENTS

| 2017/0076196 A1 | 3/2017 | Sainath et al. | |
| 2019/0199743 A1* | 6/2019 | La Marca | H04L 63/1416 |
| 2021/0397966 A1* | 12/2021 | Sun | G06V 10/82 |

FOREIGN PATENT DOCUMENTS

| KR | 102036024 B1 | 10/2019 | |
| WO | 2015022838 A1 | 2/2015 | |
| WO | WO-2020178811 A1 * | 9/2020 | ............. G06F 11/07 |

OTHER PUBLICATIONS

Avatefipour, "Physical-Fingerprinting of Electronic Control Unit (ECU) Based on Machine Learning Algorithm for In-Vehicle Network Communication Protocol "CAN-BUS"", Computer Engineering, University of Michigan-Dearborn. Available Online at: https://deepblue.lib.umich.edu/handle/2027.42/140731, Dec. 16, 2017, 71 pages.

(Continued)

*Primary Examiner* — Brian F Shaw
(74) *Attorney, Agent, or Firm* — Kilpatrick Townsend & Stockton LLP

(57) ABSTRACT

In one example, a method comprises: receiving, at a gateway of a Controller Area Network (CAN) bus on a vehicle and via at least one of a wireless interface or a wired interface of the vehicle, a plurality of messages targeted at electronic control units (ECU) on the CAN bus; generating one or more input vectors based on the plurality of messages; generating, using one or more machine learning models, an output vector based on each of the one or more input vectors, each input vector having the same number of elements as the corresponding output vector; generating one or more comparison results between each of the one or more input vectors and the corresponding output vector; and based on the one or more comparison results, performing one of: allowing the plurality of messages to enter the CAN bus or preventing the plurality of messages from entering the CAN bus.

18 Claims, 21 Drawing Sheets

(51) Int. Cl.
*H04W 12/088* (2021.01)
*H04W 12/106* (2021.01)

(58) Field of Classification Search
CPC ....... H04W 12/121; H04W 4/70; G06F 11/07; G06F 21/554; G06F 21/56; G06F 21/564; G06F 21/552; G06F 21/577; G06F 2221/034; G06F 16/285; G06F 30/27; G06F 2201/86; H04L 63/1408; H04L 63/1416; H04L 63/1441; H04L 63/1425; H04L 41/142; H04L 41/147; H04L 41/16; H04L 43/04; G06N 3/0454; G06N 3/088; G06N 3/08; G06N 3/02; G06N 20/00
See application file for complete search history.

(56) References Cited

OTHER PUBLICATIONS

PCT/US2021/040711 , "International Search Report and Written Opinion", dated Oct. 19, 2021, 11 pages.
Yang et al., "Identify a Spoofing Attack on an In-Vehicle CAN Bus Based on the Deep Features of an ECU Fingerprint Signal", Available Online at: https://doi.org/10.3390/smartcities3010002, Jan. 17, 2020, pp. 17-30.

* cited by examiner

Graph 250

Graph 252

METHOD AND SYSTEM FOR HANDLING NETWORK INTRUSION

BACKGROUND

Modern vehicles are integrated with a number of hardware devices, known as Electronic Control Units (ECUs). Controlled by complicated computer programs, ECUs can control various subsystems of the vehicle, such as the powertrain system, the security system, the infotainment system, etc. The ECUs are typically connected over one or more in-vehicle networks, such as Controller Area Network (CAN) buses. Multiple CAN buses can be connected via a gateway which can route messages among the multiple CAN buses.

Recently, modern vehicles are becoming smarter by equipping automotive networking services, including Vehicle-to-Vehicle (V2V) and Vehicle-to-Infrastructure (V2I), which altogether are generally referred as (Vehicle-to-Everything) V2X. V2X provides external access to, for example, inspect the internal status of a vehicle, or otherwise access other functionalities provided by the ECUs (e.g., infotainment system), and can have a direct impact on the functionality of ECUs. The ECUs can also be accessible by other wired or wireless network connections, such as Bluetooth connection, Universal Serial Bus (USB) connection, etc.

However, V2X communications, along with other potential network connections such as Bluetooth and USB connections, can pose threats regarding the security of ECUs. Specifically, an adversary would be able to send malicious network packets remotely via the network connections into an ECU, which can then distribute the network packets to each ECU connected to the CAN bus. The malicious network packets can compromise the operations of the ECUs, which can put the passengers of the vehicle in danger or otherwise adversely affect the operation of the vehicle.

BRIEF SUMMARY

In one example, a method is provided. The method comprises: receiving, at a gateway of a Controller Area Network (CAN) bus on a vehicle and via at least one of a wireless interface or a wired interface of the vehicle, a plurality of messages targeted at one or more electronic control units (ECU) coupled with the CAN bus; generating one or more input vectors based on the plurality of messages, each of the one or more input vectors having a first number of elements; generating, using one or more machine learning models, a corresponding output vector based on each of the one or more input vectors, each output vector having the first number of elements; generating one or more comparison results between each of the one or more input vectors and the corresponding output vector; and based on the one or more comparison results, performing one of: allowing the plurality of messages to enter the CAN bus or preventing the plurality of messages from entering the CAN bus.

In some aspects, the wireless interface comprises a vehicle-to-everything (V2X) interface. The wired interface comprises at least one of a Universal Serial Bus interface or a Bluetooth interface.

In some aspects, each of the one or more input vectors is generated based on a non-overlapping window of messages of the plurality of messages.

In some aspects, each of the one or more input vectors is generated based on an overlapping window of messages of the plurality of messages.

In some aspects, each of the plurality of messages includes an arbitration identifier and a payload. The one or more input vectors are generated based on at least one of the arbitration identifier or the payload of each of the plurality of messages.

In some aspects, the one or more machine learning models comprise one or more encoders and one or more corresponding decoders. Generating, using one or more machine learning models, a corresponding output vector based on each of the one or more input vectors comprises: transforming, using the one or more encoders, each of the one or more input vectors to a corresponding intermediate vector, the intermediate vector having a second number of elements, the second number being smaller than the first number; and reconstructing, using the one or more corresponding decoders, the one or more output vectors from the corresponding one or more intermediate vectors.

In some aspects, the one or more comparison results comprise a combined reconstruction loss between the one or more input vectors and the corresponding one or more output vectors. The plurality of messages is prevented from entering the CAN bus based on the combined reconstruction loss exceeding a threshold.

In some aspects, the one or more encoders comprises a plurality of encoders, each encoder being associated with an arbitration identifier included in the plurality of messages. The one or more decoders comprises a plurality of decoders, each decoder being associated with the arbitration identifier of the corresponding encoder. Each element of the one or more input vectors is generated based on the payload of a message of the plurality of messages. Generating, using one or more machine learning models, an output vector based on each of the plurality of input vectors comprises, for each input vector of the plurality of input vectors comprises: selecting a corresponding pair of encoder and decoder from, respectively, the plurality of encoders and the plurality of decoders based on the arbitration identifier of the input vector; and generating the output vector for the input vector using the selected pair of encoder and decoder.

In some aspects, each corresponding pair of encoder and decoder is trained based on a training set of normal messages having the associated arbitration identifier, the training set of normal messages received from one or more vehicles during normal operations of the one or more vehicles.

In some aspects, the one or more encoders comprises an encoder. The one or more decoders comprises a decoder. Each element of the one or more input vectors is generated based on the payload and the arbitration identifier of a message of the plurality of messages. Generating, using one or more machine learning models, an output vector based on each of the plurality of input vectors comprises, for each input vector of the plurality of input vectors, generating the output vector for the input vector using the encoder and the decoder.

In some aspects, the method further comprises transforming the arbitration identifier of each of the plurality of messages to a multi-dimensional identifier vector. Each element of the one or more input vectors is generated based on the payload and the identifier vector of the arbitration identifier of a message of the plurality of messages.

In some aspects, the method further comprises: determining, for each message of the plurality of messages, a timestamp representing a time when the message is received. Each element of the one or more input vectors is generated based on the payload, the identifier vector, and the timestamp of a message of the plurality of messages.

In some aspects, the one or more machine learning models include a recurrent neural network.

In some aspects, the recurrent neural network comprises a long short term memory (LSTM) network.

In some examples, an apparatus is provided. The apparatus comprises: a memory that stores a set of instructions; and a hardware processor configured to execute the set of instructions to: receive, at a gateway of a Controller Area Network (CAN) bus on a vehicle and via at least one of a wireless interface or a wired interface of the vehicle, a plurality of messages targeted at one or more electronic control units (ECU) coupled with the CAN bus; generate one or more input vectors based on the plurality of messages, each of the one or more input vectors having a first number of elements; generate, using one or more machine learning models, a corresponding output vector based on each of the one or more input vectors, each input vector having the first number of elements; generate one or more comparison results between each of the one or more input vectors and the corresponding output vector; and based on the one or more comparison results, perform one of: allowing the plurality of messages to enter the CAN bus or preventing the plurality of messages from entering the CAN bus.

In some aspects, the wireless interface comprises a vehicle-to-everything (V2X) interface. The wired interface comprises at least one of a Universal Serial Bus interface or a Bluetooth interface.

In some aspects, each of the plurality of messages includes an arbitration identifier and a payload. The one or more input vectors are generated based on at least one of the arbitration identifier or the payload of each of the plurality of messages.

In some aspects, the one or more machine learning models comprise one or more encoders and one or more corresponding decoders. Generating, using one or more machine learning models, a corresponding output vector based on each of the one or more input vectors comprises the hardware processor being configured to: transforming, using the one or more encoders, each of the one or more input vectors to a corresponding intermediate vector, the intermediate vector having a second number of elements, the second number being smaller than the first number; and reconstructing, using the one or more corresponding decoders, the one or more output vectors from the corresponding one or more intermediate vectors.

In some aspects, the one or more machine learning models include a recurrent neural network.

In some examples, a non-transitory computer readable medium is provided. The non-transitory computer readable medium stores instructions that, when executed by a hardware processor, causes the hardware processor to: receive, at a gateway of a Controller Area Network (CAN) bus on a vehicle and via at least one of a wireless interface or a wired interface of the vehicle, a plurality of messages targeted at one or more electronic control units (ECU) coupled with the CAN bus; generate one or more input vectors based on the plurality of messages, each of the one or more input vectors having a first number of elements; generate, using one or more machine learning models, a corresponding output vector based on each of the one or more input vectors, each input vector having the first number of elements; generate one or more comparison results between each of the one or more input vectors and the corresponding output vector; and based on the one or more comparison results, perform one of: allowing the plurality of messages to enter the CAN bus or preventing the plurality of messages from entering the CAN bus.

BRIEF DESCRIPTION OF THE DRAWINGS

The detailed description is set forth with reference to the accompanying figures.

DETAILED DESCRIPTION

Figure 1A:
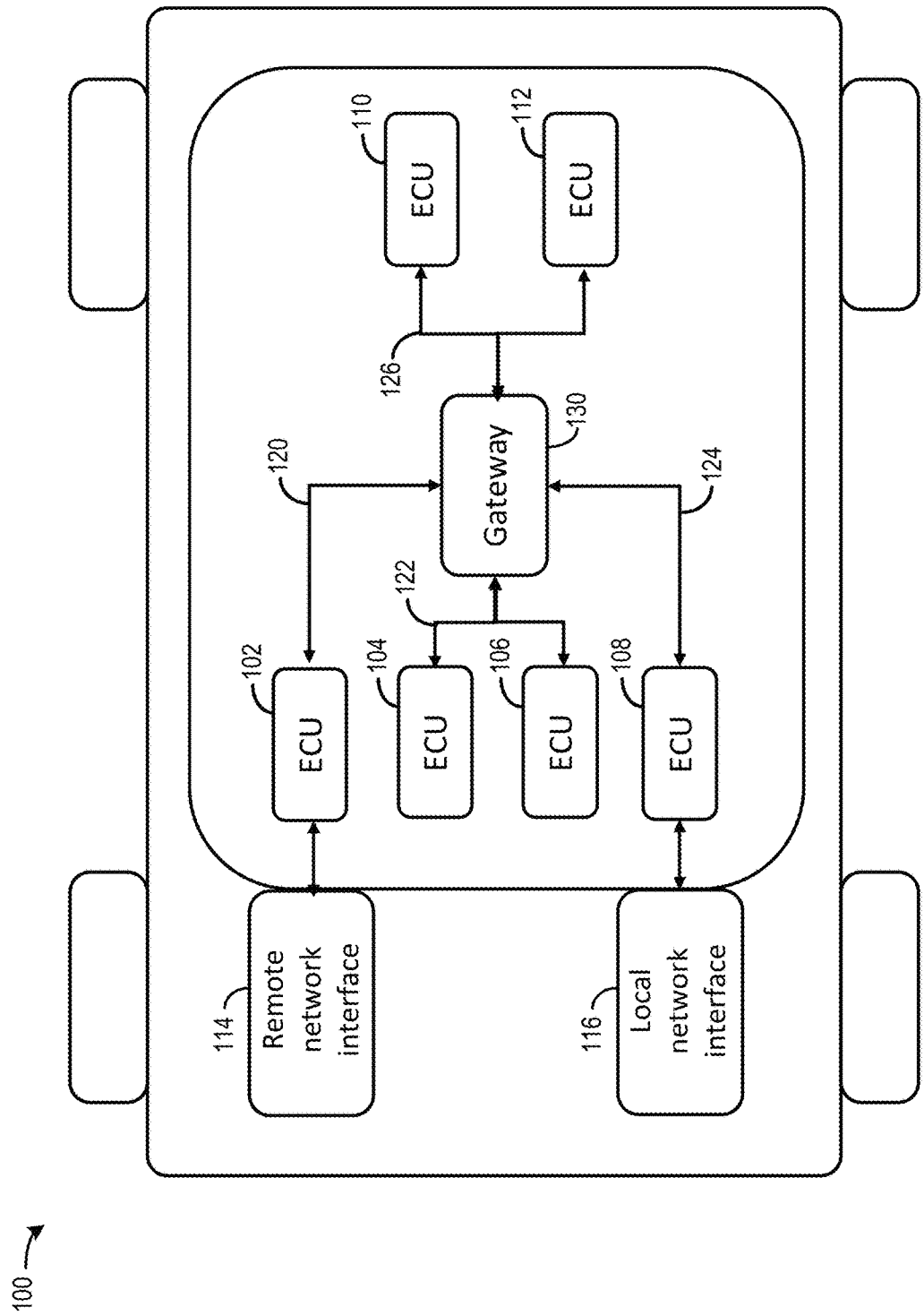
FIG. 1A, FIG. 1B, and FIG. 1C show a vehicle platform and its operations for which examples of the disclosed techniques described herein can be implemented.

Aspects of the present disclosure relate generally to a network device, and in particular to an in-vehicle network security system that detects and handles network instruction, according to certain examples.

In the following description, various examples of a vehicle security system will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Modern vehicles are integrated with a number of Electronic Control Units (ECUs). Controlled by complicated computer programs, ECUs can control various subsystems of the vehicle, such as the powertrain system, the security system, the infotainment system, etc. The ECUs are typically connected over one or more in-vehicle networks, such as Controller Area Network (CAN) buses. The CAN bus operates based on a multi-master serial bus standard, in which each component connected to the CAN bus, such as an ECU, a gateway, etc., can take turns in driving the serial bus to send a broadcast message. The broadcast message can then reach each component connected to the CAN bus, and a target component of the broadcast message can then consume the message. Each component connected to the CAN bus is assigned with an identifier, such as an arbitration identifier. The arbitration identifier can be included in the message and can determine the priority by which each component sends the message in the CAN bus when multiple components attempt to send a message at the same time. Multiple CAN buses can be connected via a gateway which can route messages among the multiple CAN buses.

Some of the ECUs, such as ECUs involved in communication, are externally accessible via various wired/wireless network interfaces, such as V2X communications, Bluetooth and USB connections, etc. These network interfaces can receive data packets from a remote source, and transmit the data packets to the communication ECUs. The communication ECUs may then transmit the content of the network packets over the CAN bus in the form of broadcast messages. The network interfaces can provide network connectivity to a vehicle. For example, through the network interfaces and the CAN bus, a remote user can obtain data that reflect the operation state of a vehicle from various ECUs of the vehicle. As another example, a broadcaster can transmit content wirelessly to a vehicle, which can then deliver the content to the passenger via the infotainment system.

While these interfaces bring about network connectivity to a vehicle, the network connectivity can also pose security risks. Specifically, an adversary would be able to send malicious network packets remotely via the interfaces into the CAN buses to compromise the operations of the ECUs. Currently, the CAN bus lacks a mechanism to prevent these malicious network packets from reaching the ECUs. The CAN bus simply broadcasts the received malicious network packets as messages to each ECU connected on the CAN bus. These malicious network packets can compromise the operations of the ECUs, which can put the passengers of the vehicle in danger or otherwise adversely affect the operation of the vehicle.

Conceptual Overview of Certain Embodiments

Examples of the present disclosure relate to an in-vehicle network security system, such as an in-vehicle network security system 200 of FIG. 2, that can address at least some of the problems described above. The in-vehicle network security system can be interposed between one or more communication ECU that connect with a wireless/wired network interface (e.g., a V2X interface, a USB interface, or a Bluetooth interface) and a gateway to one or more CAN buses. In some examples, the in-vehicle network security system can also be part of the gateway.

The in-vehicle network security system can receive and buffer a plurality of messages from the one or more communication ECUs. The in-vehicle network security system can also store information indicative of features of prior normal messages on the CAN bus during a normal operation of a vehicle when the vehicle is not under any kind of network intrusion and there is no malicious message being transmitted on the CAN bus. The in-vehicle network security system can be trained based on the prior normal messages to acquire the information. Based on the stored information, the in-vehicle network security system can determine whether the plurality of messages are normal messages and do not include abnormal/malicious messages. If the in-vehicle network security system determines that the plurality of messages conform with the prior normal messages and do not include abnormal/malicious messages, the in-vehicle network security system can allow the plurality of messages to enter the one or more CAN buses to reach other ECUs. On the other hand, if the in-vehicle network security system determines that the plurality of messages deviate from the feature patterns derived from the prior normal messages, the in-vehicle network security system can take various actions, such as trapping/discarding the plurality of messages, sending a notification indicating that abnormal/potentially malicious messages are received, etc.

Specifically, the in-vehicle network security system may include an input vector generation module, an abnormal message detection module, and a message handling module. The input vector generation module can generate one or more input vectors for the plurality of messages received from the communication ECUs, with each vector including a number of elements corresponding to a number of messages (e.g., a window of ten messages). Each element can include one or more numerical values representing one or more features of a message. The features may include, for example, a timestamp of reception of the message, an arbitration identifier of the message, a payload of the message, etc. The input vector generation module can then transmit the input vectors to abnormal message detection module to determine whether the received messages include features of normal messages.

The abnormal message detection module can include a machine-learning model that can be trained, based on a training set of prior normal messages, to detect whether the input vectors only include normal messages and do not include abnormal messages (e.g., malicious messages, or other messages that deviate from the feature patterns derived from the training set of prior normal messages). Specifically, the machine learning model can include an autoencoder which can include a pair of encoder and decoder. The encoder can include a first neural network having a first set of weights. As part of an encoding operation, the encoder can combine the first set of weights with the input vectors to generate intermediate vectors having a reduced dimension (e.g., a reduced number of elements) compared with the input vectors. Moreover, the decoder can include a second neural network having a second set of weights. As part of a reconstruction operation, the decoder can combine the second set of weights with the intermediate vectors to generate output vectors as a reconstructed version of the input vectors. The machine learning model can also output a reconstruction loss between the input vectors and the output vectors to the message handling module.

As described above, the encoding of the input vector into intermediate vectors includes a dimensionality reduction, which represents a compressed knowledge representation of the input vector. On the other hand, the decoding of the intermediate vectors represents a reconstruction of the input vector based on the compressed knowledge representation of the input vector. The autoencoder can be trained to, based on a training set of prior normal messages and through dimensionality reduction, generate a representation of the normal messages features of input vectors to form the intermediate vectors, and then build the output vectors to reconstruct the input vectors from the intermediate vectors. The dimensionality reduction can remove certain information from the representation, such as noise information, which can lead to a reconstruction loss between the input and output vectors. Through the training, the autoencoder can encode and then decode input vectors of normal messages to maximize the amount of normal messages features retained in the representation to minimize the reconstruction loss, while input vectors of abnormal messages are encoded and decoded with increased reconstruction loss. During the training, the weights of the encoders and the decoders can be iteratively adjusted to reduce the reconstruction loss for normal messages until, for example, the reconstruction loss reaches a minimum, or otherwise plateaus as the weights change, and the training operation can stop. A distribution of reconstruction losses among the training set of messages can be determined, and a threshold reconstruction loss that indicates a message (or a plurality of messages) belongs to abnormal messages can be determined based on the distribution. As an example, the threshold reconstruction loss can be set a value which exceeds the reconstruction loss for 98% of the training set of messages.

To determine whether the plurality of messages include abnormal/malicious messages, the abnormal message detection module can process the input vectors using the trained autoencoder to generate output vectors, and then determine a combined reconstruction loss for the input vectors. If the combined reconstruction loss exceeds the threshold, the message handling module can determine that the plurality of messages belong to abnormal messages and take various actions, such as trapping/discarding the plurality of messages, sending a notification indicating that abnormal/potentially malicious messages are received, etc. On the other hand, if the combined reconstruction loss is below the threshold, the message handling module can determine that the plurality of messages are normal messages and allows the messages to enter the entry point and the one or more CAN buses.

Training an autoencoder in an unsupervised training operation, based on a training set of normal messages, allows the training to be performed on a large volume of messages. This allows the training data to include a wide variety of patterns of normal message features, which can improve the accuracy of the autoencoder in distinguishing between normal and abnormal messages. Specifically, in a supervised training operation, messages labeled as abnormal messages and normal messages are supplied to train the machine learning model to generate the correct detection output for training messages of each label. The labeling of the messages is typically a resource intensive and time consuming process, and time and resource constraints can limit the volume of messages being labeled and supplied to train the machine learning model. Using only messages having normal message features to train the autoencoder can remove the need of labeling the messages, which allows a large volume of messages to be used for the training operation. In addition, abnormal messages, such as malicious messages, are typically rare and not easily obtainable, unlike normal messages which can be easily obtained during the normal operation of a vehicle. As a result, only a small set of abnormal message features may be available to train the machine learning model to detect abnormal messages, which can degrade the accuracy of abnormal message detection by the machine learning model. In contrast, with autoencoder, the focus of training will be to learn and recognize various features of normal messages. Therefore, while there is no need to supply the rare and hard-to-find abnormal messages to train the autoencoder, the autoencoder can also be trained with a large volume of easily-accessible normal messages that cover a wide range of normal message features to improve the autoencoder's capability in detecting normal messages. As a result, the accuracy of the machine learning model in distinguishing between normal messages and abnormal messages can be improved.

Various arrangements of the autoencoder are proposed. In one example, the machine learning model may include a plurality of autoencoders, with each autoencoder associated with a particular arbitration identifier. Each autoencoder can be trained based on a training set of normal messages that include the particular arbitration identifier. For an input vector, the abnormal message detection module can select an autoencoder associated with the arbitration identifier of the message from which the input vector is generated, process the input vector using the selected autoencoder to compute the output vector, and determine the reconstruction loss. In such an example, an autoencoder can be trained to learn features of payload data of normal message features for a specific arbitration identifier. Such arrangements allow the autoencoder to learn from a larger variety of patterns of normal message features associated with the specific arbitration identifier, which in turn can improve the performance of the autoencoder in detecting abnormal message features associated with the specific arbitration identifier, especially in cases where the CAN buses are expected to transmit long sequences of messages associated with the same arbitration identifier.

In some examples, the machine learning model may include an autoencoder trained based on a training set of messages having different arbitration identifiers. Such an autoencoder can be trained as a one-fits-all model to detect abnormal messages having different arbitration identifiers. In such example, the autoencoder can be trained to learn normal message features comprising sequences of arbitration identifiers and payload data. In some examples, to improve the learning of normal message features from long sequences of messages having different arbitration identifiers, each of the encoder and the decoder of the autoencoder may include a recurring neural network which can generate outputs based on a history of prior outputs. This allows the encoder to generate an intermediate vector from an input vector of a current message as well as input vectors of prior messages. Moreover, the decoder can also generate an output vector from an intermediate vector as well as prior intermediate vectors. Such arrangements can improve the performance of the autoencoder in detecting abnormal messages having different arbitration identifiers, especially in cases where the CAN buses are expected to transmit long sequences of messages having different arbitration identifiers.

Using a autoencoder trained as a one-fits-all model to detect a normal (or abnormal) message sequence allows detection of additional potential threats. In one example, an adversary may inject malicious messages that have the same characteristics (e.g., payloads) as normal messages. In another example, an adversary may inject a small number of malicious messages for each arbitration identifier (e.g., for different target ECUs). The percentage of malicious messages for each arbitration identifier may be small, but the malicious messages with different arbitration identifiers altogether may lead to serious consequences, such as multipole ECUs being attacked at the same time. For both examples, the one-fits-all autoencoder can be trained to detect sequences of different arbitration identifiers and payloads in normal message traffic, and can detect abnormal messages when, for example, it detects a sequence of arbitration identifiers and payloads different from the sequences in normal message traffic which the autoencoder has learnt from the training operation.

With the disclosed examples, an in-vehicle network security system can detect abnormal messages that pose potential security threats to the vehicle and stop those messages from reaching the ECUs of the vehicle. This can reduce the security risk posed by the network connections (e.g., V2X, Bluetooth, USB) to a vehicle. Moreover, by employing a trained machine learning model to learn from the prior normal messages to perform the detection, the detection can be adapted to different operating conditions of different vehicles, and the accuracy of the detection can be improved. Further, by training an autoencoder using normal messages in an unsupervised training operation, as opposed to a supervised learning operation in which a machine learning model is trained using both normal and abnormal messages, there is no need to label the training data nor to obtain the abnormal messages for the training. This allows the training to be focused on normal messages and based on a larger variety of patterns of normal message features. All these can improve the performance of the in-vehicle network security system in detecting abnormal messages and improve the security of the vehicle.

Typical System Environment for Certain Embodiments

FIG. 1A illustrates a vehicle platform 100 in which the disclosed techniques can be implemented. As shown in FIG. 1, vehicle platform 100 can include a number of Electronic Control Units (ECUs), including ECUs 102, 104, 106, 108, 110, and 112. Controlled by complicated computer programs, ECUs can control various subsystems of the vehicle, such as the communication system, the powertrain system, the security system, the infotainment system, etc. For example, ECU 102 can be connected to a remote network interface 114, such as an V2X wireless interface, to provide connection to external automotive networking services, whereas ECU 108 can be connected to a local network interface 116, such as an USB interface, a Bluetooth interface, etc., and can be accessible via passengers' devices (e.g., mobile phones).

The ECUs are connected over one or more in-vehicle networks, such as Controller Area Network (CAN) buses. Each ECU can send and receive messages over the CAN bus. In the example of FIG. 1A, ECU 102 can be connected to a CAN bus 120, ECUs 104 and 106 can be connected to a CAN bus 122, ECU 108 can be connected to a CAN bus 124, whereas ECUs 110 and 112 can be connected to a CAN bus 126. The multiple CAN buses 120, 122, 124, and 126 can be connected via a gateway 130 which can route messages among the multiple CAN buses.

Figure 1B:
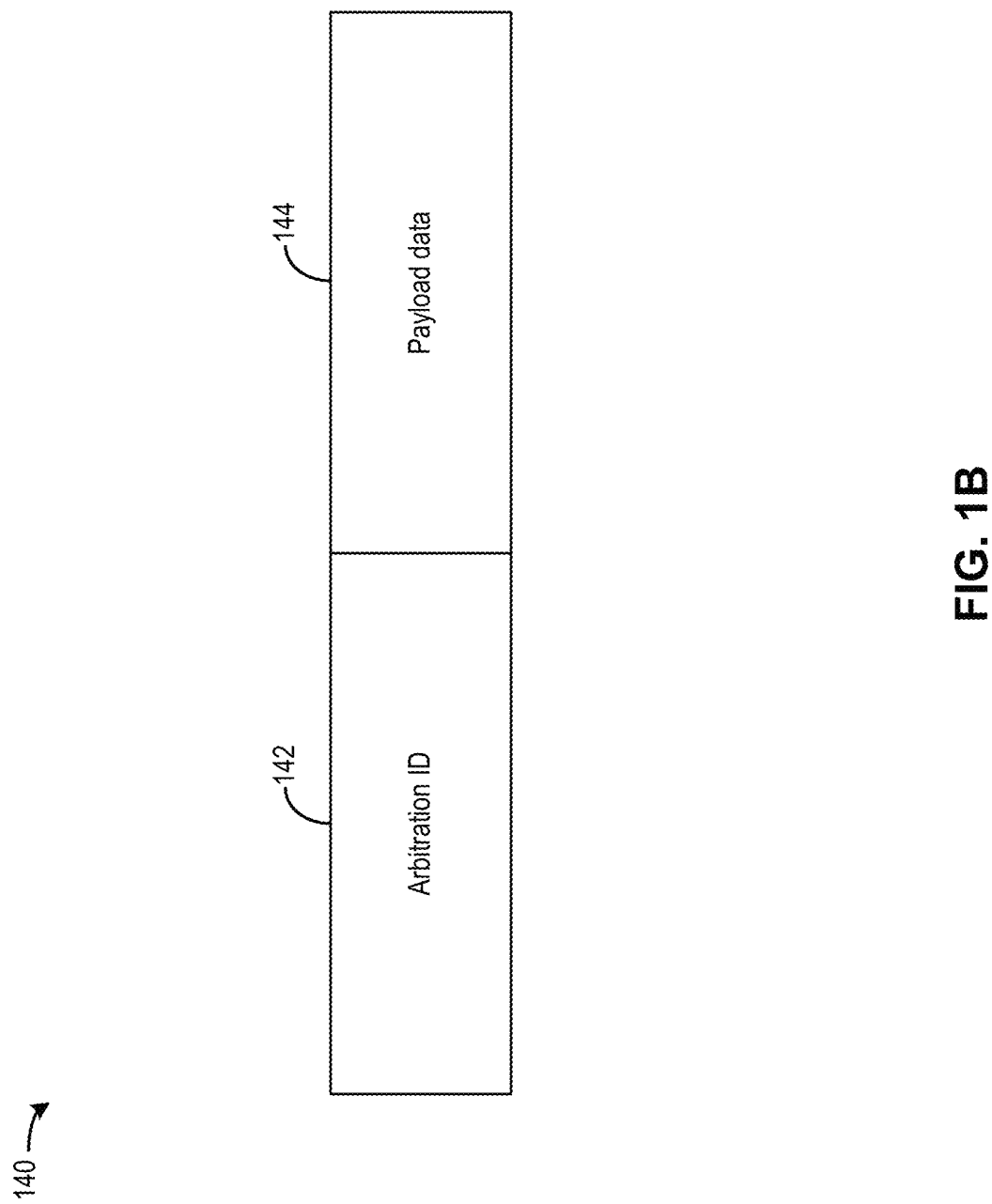

The CAN bus operates based on a multi-master serial bus standard, in which each component connected to the CAN bus, such as an ECU, a gateway, etc., can take turns in driving the serial bus to send a broadcast message. The broadcast message can then reach each component connected to the CAN bus, and a target component of the broadcast message can then consume the message. Each component connected to the CAN bus is assigned with an identifier, such as an arbitration identifier. The arbitration identifier can be included in the message and can indicate the priority of a message. FIG. 1B illustrates an example of a CAN bus message 140, which can include an arbitration identifier 142 and a payload 144. Arbitration identifier 142 can include an 11-bit or 29-bit number. A lower number can represent a higher priority. Payload 144 typically includes 8 bytes of payload data.

When multiple components attempt to send a message at the same time on the CAN bus, a higher priority message, as indicated in the arbitration identifier of the message, can be sent first, followed by other lower priority messages. Specifically, as a component attempts to send a message on the CAN bus, the component can also detect the arbitration identifier of the messages being sent on the CAN bus. If a component detects that an arbitration identifier of a higher priority message has been sent on the CAN bus, the component can stop the transmission of its own message, wait for the transmission of the higher priority message to complete, and then restart the transmission of its own message.

As described above, some of ECUs, such as ECUs 102 and 108, are externally accessible via various network interfaces, such as a V2X communication interface, a Bluetooth interface, a USB interface, etc. These interfaces can receive data packets from a remote source, and transmit the data packets to the communication ECUs. The communication ECUs may then transmit the content of the data packets over the CAN bus in the form of broadcast messages. These network interfaces can provide network connectivity to a vehicle. For example, through remote network interfaces 114 and ECU 102, a remote user can obtain data that reflect the operation state of a vehicle from various other ECUs of the vehicle. As another example, a broadcaster can transmit content wirelessly to remote network interface 114 and ECU 102, which can then transmit messages including the content over CAN bus 120. Gateway 130 can then route the messages including the content to the ECUs of the infotainment system of vehicle 100.

Figure 1C:
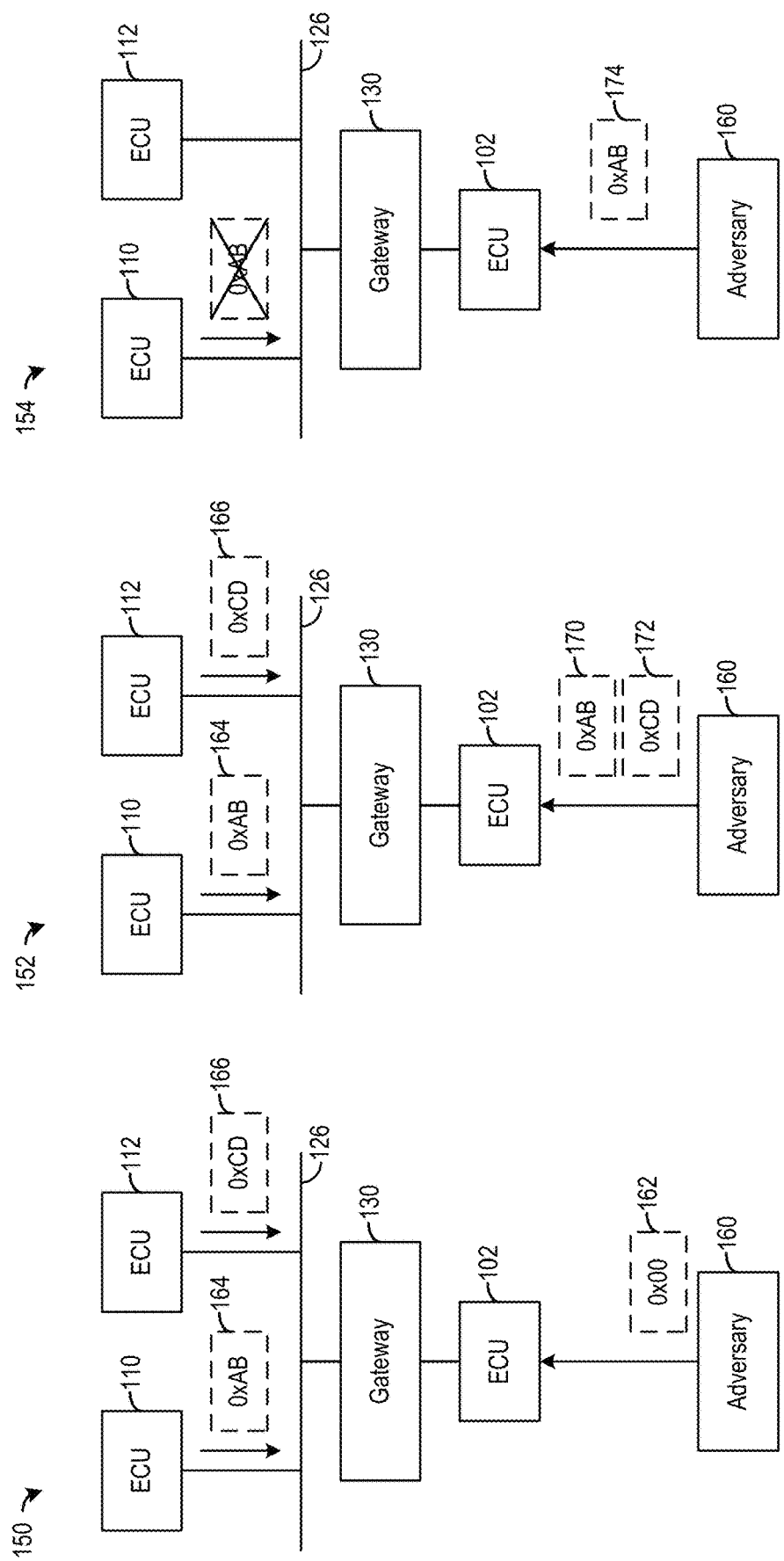

While these network interfaces bring about network connectivity to a vehicle, the network connectivity can also pose security risks. Specifically, an adversary would be able to send malicious messages remotely via the network interfaces into the CAN buses to compromise the operations of the ECUs. FIG. 1C illustrates different types of network intrusions, including a denial-of-service (DoS) attack 150, a fuzzing attack 152, and a spoofing/impersonation attack 154. Specifically, in DoS attack 150, an adversary 160 can transmit a large number of messages 162 through remote network interfaces 114 and ECU 102 to gateway 130. Messages 162 may be associated with an arbitration identifier having a low numerical value (e.g., 0x00), which indicates that messages 162 have higher priority than other messages sent by other ECUs. As a result, CAN bus 126 becomes flooded with messages 162, which prevent other ECUs (e.g., ECUs 110 and 112) from sending their messages (e.g., messages 164 and 166) to CAN bus 126. Moreover, in fuzzing attack 152, adversary 160 can transmit messages 170 and 172 including the arbitration identifiers of ECUs 110 and 112 (0xAB and 0xCD) and random payload data through remote network interfaces 114 and ECU 102 to gateway 130. The random messages can be configured to elicit responses from target ECUs. The goal of fuzzing attack 152 can be to discover combinations of messages that control different ECUs. Lastly, in spoofing/impersonation attack 154, adversary 160 can transmit a message 174 having the arbitration identifier of ECU 110 (0xAB) to impersonate ECU 110. The content of message 174 can be generated based on the responses received from the fuzzing attack 152. The transmission of message 174 can enable adversary 160 to directly control and/or communicate with a target ECU on behalf of ECU 110.

DoS attack 150, fuzzing attack 152, and spoofing/impersonation attack 154, if undeterred, can compromise the operations of the ECUs. Specifically, in DoS attack 150, if gateway 130 allows adversary 160 to flood CAN bus 126 with messages 162, other ECUs will not be able to use CAN bus 126 to transmit/receive critical information to/from other subsystems of the vehicle. Moreover, as a result of fuzzing attack 152 and spoofing/impersonation attack 154, adversary 160 can also establish direct control over certain ECUs of the vehicle. All these can put the passengers of the vehicle in danger, or otherwise adversely affect the operation of the vehicle.

Examples of an In-Vehicle Network Security System

Figure 2A:
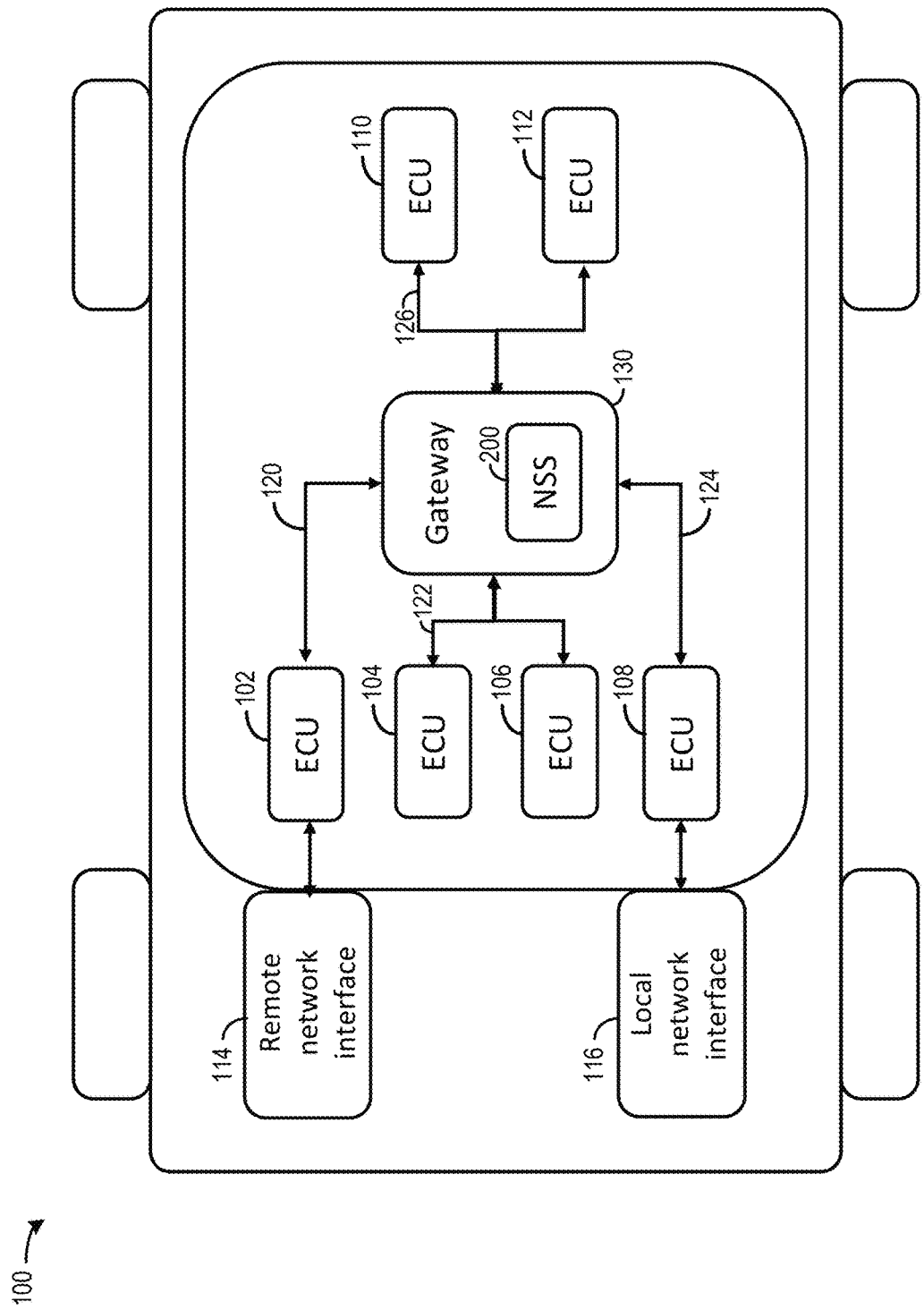
FIG. 2A, FIG. 2B, FIG. 2C, FIG. 2D, FIG. 2E, and FIG. 2F illustrate examples of an in-vehicle security system, according to certain embodiments.

FIG. 2A illustrates an in-vehicle network security system (NSS) 200 that can detect abnormal/malicious messages and prevent those messages from entering the CAN bus of a vehicle. NSS 200 can receive and buffer messages from one or more ECUs, such as ECUs 102 and 108. NSS 200 can also store information indicative of features included in normal messages on the CAN bus during the normal operation of a vehicle. Based on the stored information, NSS 200 can determine whether the received messages are normal messages. If the in-vehicle network security system determines that the plurality of messages are normal messages, NSS 200 can allow the messages to enter the entry point of the one or more CAN buses. On the other hand, if NSS 200 determines that the messages include abnormal/malicious messages, NSS 200 can take various actions, such as trapping/discarding the plurality of messages, sending a notification indicating that abnormal/potentially malicious messages are received, etc.

As shown in FIG. 2A, NSS 200 can be part of gateway 130. NSS 200 can analyze incoming messages sent from each of ECUs 102-112, or ECUs connected to network interfaces 114 and 116 (e.g., ECUs 102 and 108), and release incoming messages that are deemed to include features of normal messages to gateway 130 to be routed to other CAN buses. In some examples, NSS 200 can also be external to gateway 130 and can interpose between each of ECUs 102-112, or ECUs 102 and 108, and gateway 130.

Figure 2B:
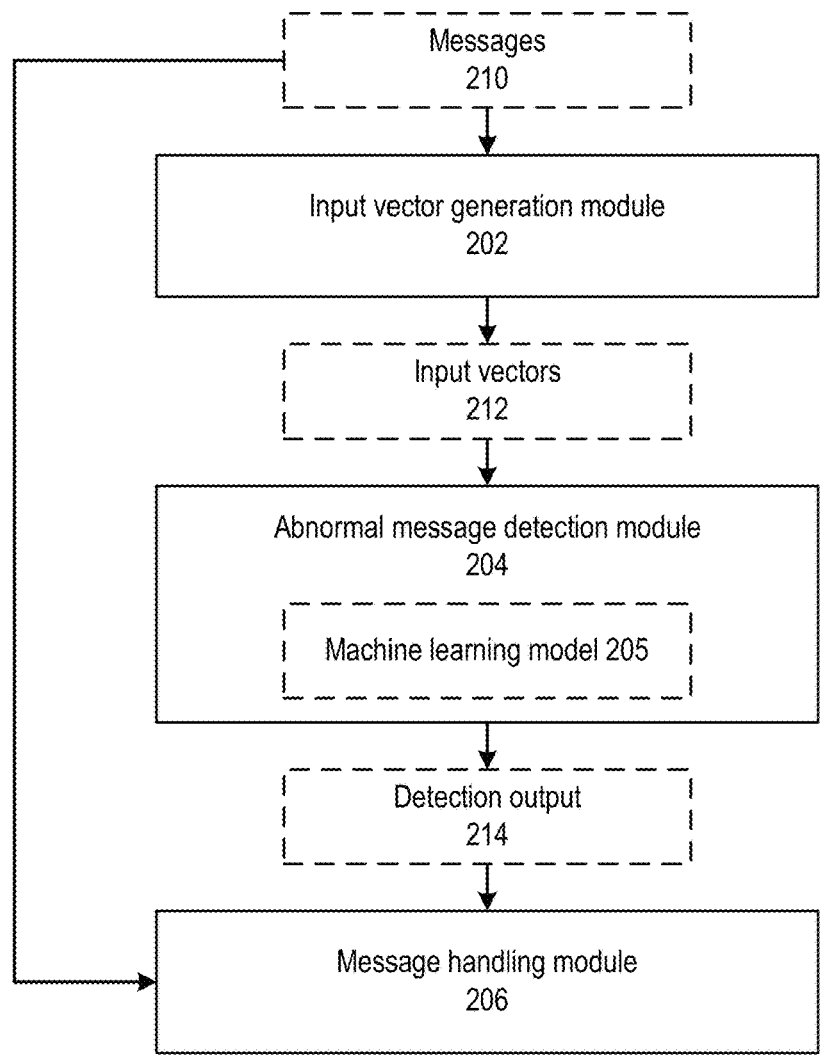
Figure 2C:
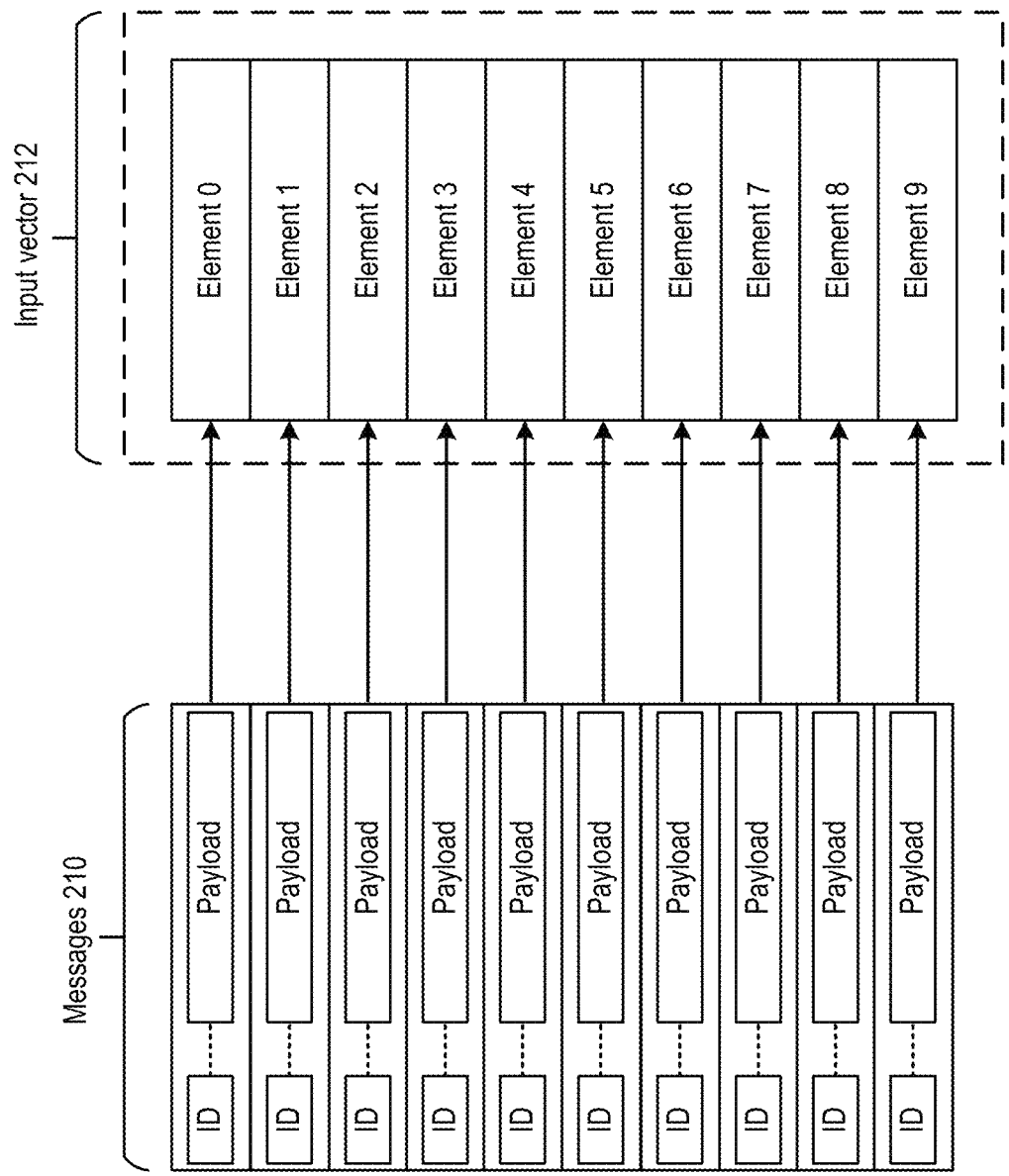

FIG. 2B illustrates example internal components of NSS 200. As shown in FIG. 2B, NSS 200 includes an input vector generation module 202, an abnormal message detection module 204, and a message handling module 206. Input vector generation module 202 can receive messages 210 and generate one or more input vectors 212 from messages 210. FIG. 2C illustrates an example of input vector 212. As shown in FIG. 2C, an input vector 212 may include multiple elements (e.g., element 0, element 1, element 2), with each element corresponding to a message. Each element can include one or more numerical values representing one or more features of a message. The features may include, an arbitration identifier (e.g., ID0, ID1, ID2) of the message, a payload (e.g., payload 0, payload 1, payload 2) of the message, etc. In some examples, as to be described below, the features may also include a timestamp at which a message is received. One or more of the arbitration identifier, payload, or timestamp of a message can be included in an element of input vector 212 corresponding to the message. In addition, accumulative clock drift, which can be computed for a plurality of messages represented in an input vector, can also be included as a feature in the input vector.

In the example of FIG. 2C, input vector 212 may include 10 elements corresponding to ten messages. Input vector generation module 202 can divide the received messages into windows of ten elements, and then generate an input vector 212 for each window of messages. Input vector generation module 202 can then transmit input vectors 212 to abnormal message detection module 204. In some examples, input vector 212 can also be generated based on overlapping windows of messages.

Figure 2D:
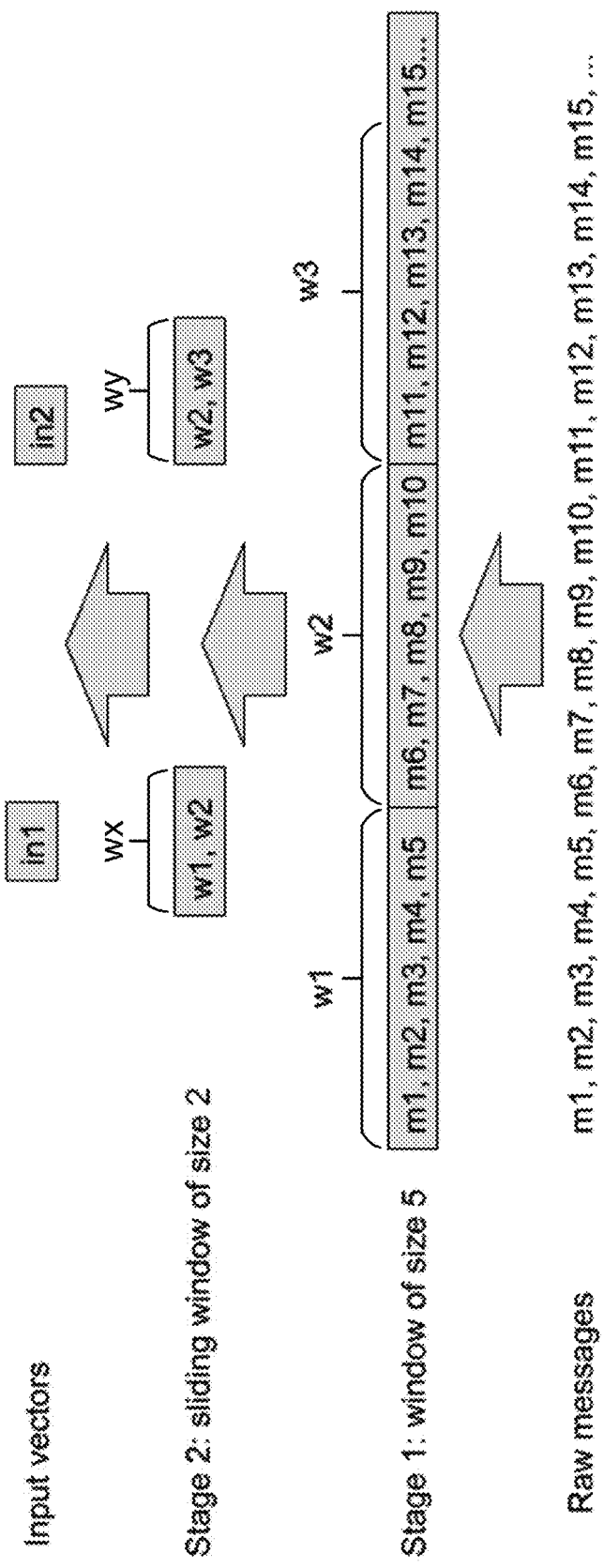

FIG. 2D illustrates a multi-stage operation 230 for generating input vectors (e.g., input vector 212) from overlapping windows of messages. As shown in FIG. 2D, in a first stage, messages are grouped in non-overlapping windows. In the example of FIG. 2D, each non-overlapping window includes five messages. For example, window 1 (labeled "w1") includes information from messages m1, m2, m3, m4, and m5, window 2 (labeled "w2") includes information from messages m6, m7, m8, m9, and m10, whereas window 3 (labeled "w3") includes information from messages m11, m12, m13, m14, and m15. In a second stages, a sliding window mechanism can be applied to obtain windows of ten messages from the windows of five messages from the first stage. For example, window x (labeled "wx") includes window 1 and window 2, whereas window y (labeled "wy") includes window 2 and window 3, and both windows wx and wy include information from messages m6-m10 of window 2. An input vector in1 can be generated based on the ten messages included in window wx, whereas an input vector in2 can be generated based on the ten messages included in window wy.

Abnormal message detection module 204 can perform an abnormal message detection operation on input vectors 212 to determine whether input vectors 212 include pattern/sequence of features (e.g., a pattern of payload data, arbitration identifiers, timestamps) that deviate from those of normal messages, and generate a detection output 214. The decision output 214 can indicate either input vectors 212 represent only normal messages, or input vectors 212 include abnormal messages. Message handling module 206 can then perform an action with regard to message 210 based on detection output 214. If detection output 214 indicates that messages 210 include only normal messages, message handling module 206 can allow the messages to enter other CAN buses via gateway 130. On the other hand, if NSS 200 determines that the messages include abnormal/malicious messages, message handling module 206 can take various actions, such as trapping/discarding the plurality of messages, sending a notification indicating that abnormal/potentially malicious messages are received, etc.

Figure 2E:
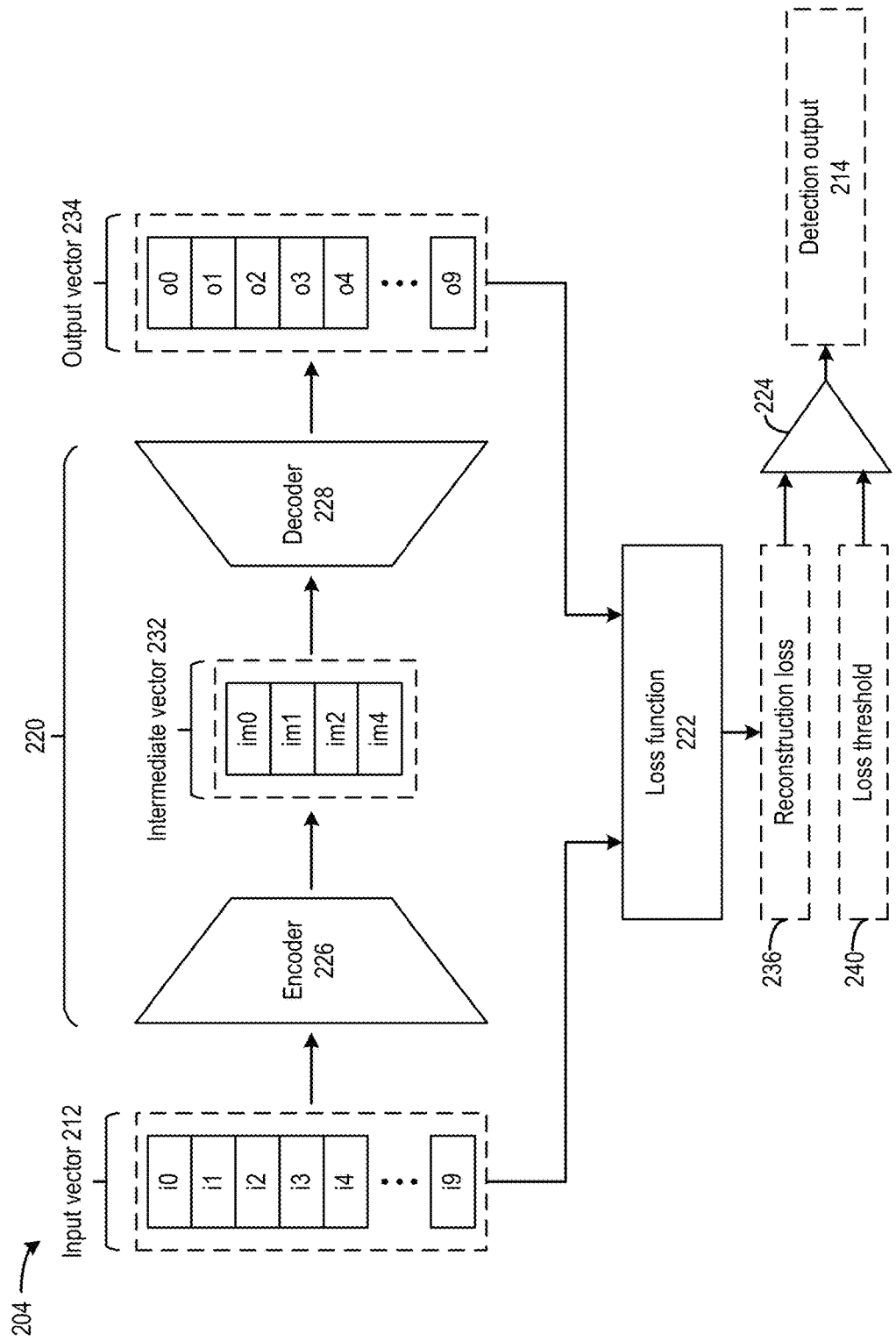

Abnormal message detection module 204 can include a machine learning model 205 which can be trained, using a training set of normal messages, to detect whether the input vectors include the normal message features. In some examples, machine learning model 205 may include an autoencoder and a loss function. FIG. 2E illustrates an example of internal components of abnormal message detection module 204. As shown in FIG. 2E, abnormal message detection module 204 can include an autoencoder 220 and a loss function 222 which can be part of machine learning model 205, and a comparator 224. Autoencoder 220 includes a pair of encoder 226 and decoder 228. Encoder 226 can transform input vector 212 into an intermediate vector 232 having a reduced dimensionality with respect to input vector 212. In the example shown in FIG. 2E, input vector 212 has ten elements (i0, i1, i2, . . . i9), while intermediate vector 232 has four elements. Decoder 228 can reconstruct output vector 234 from intermediate vector 232. Output vector 234 has the same dimensionality (ten elements, o0, o1, o2, . . . o9) as input vector 212.

The encoding of the input vector into intermediate vectors, which includes a dimensionality reduction, represents a compressed knowledge representation of the input vector. On the other hand, the decoding of the intermediate vectors represents a reconstruction of the input vector based on the compressed knowledge representation of the input vector. As the reconstruction is based on compressed knowledge representation of the input vector, the reconstruction is not exact, and there can be some differences between the input vector and the output vector, which leads to a reconstruction loss. Autoencoder 220 can be trained in an unsupervised training operation and based on a training set of normal messages. Autoencoder 220 can be trained to, based on a training set of prior normal messages and through dimensionality reduction, generate a representation of the normal messages features of input vectors to form the intermediate vectors, and then build the output vectors to reconstruct the input vector from the intermediate vectors. The dimensionality reduction can remove certain information from the representation, such as noise information, which can lead to a reconstruction loss between the input and output vectors. Through the training, autoencoder 220 can encode and then decode input vectors of normal messages to maximize the amount of normal messages features retained in the representation to minimize the reconstruction loss, while input vectors of abnormal messages are encoded and decoded with increased reconstruction loss. As a result, if input vector 212 includes a pattern/sequence of features (e.g., a pattern of payload data, arbitration identifiers, timestamps) of normal messages that have been learnt and can be detected by autoencoder 220, autoencoder 220 can reconstruct output vector 234 having a reduced reconstruction loss. On the other hand, if input vector 212 include features that deviate from the normal feature patterns in the training set of normal messages, autoencoder 220 can still reconstruct output vector 234, but the reconstruction loss can be huge.

After output vector 234 is generated, loss function 222 can compute a reconstruction loss 236 between input vector 212 and its corresponding output vector 234. Reconstruction loss 236 can be based on computing, for example, a Mean Square Error (MSE) between input vector 212 and output vector 234. Other techniques can also be used, such as Gaussian kernel density estimates. Comparator 224 can compare reconstruction loss 236 against a loss threshold 240 to generate detection output 214. Specifically, if reconstruction loss 236 exceeds loss threshold 240, comparator 224 can generate detection output 214 indicating that the messages represented by input vector 212 are abnormal messages. On the other hand, if reconstruction loss 236 is below loss threshold 240, comparator 224 can generate detection output 214 indicating that the messages represented by input vector 212 are normal messages.

Figure 2F:
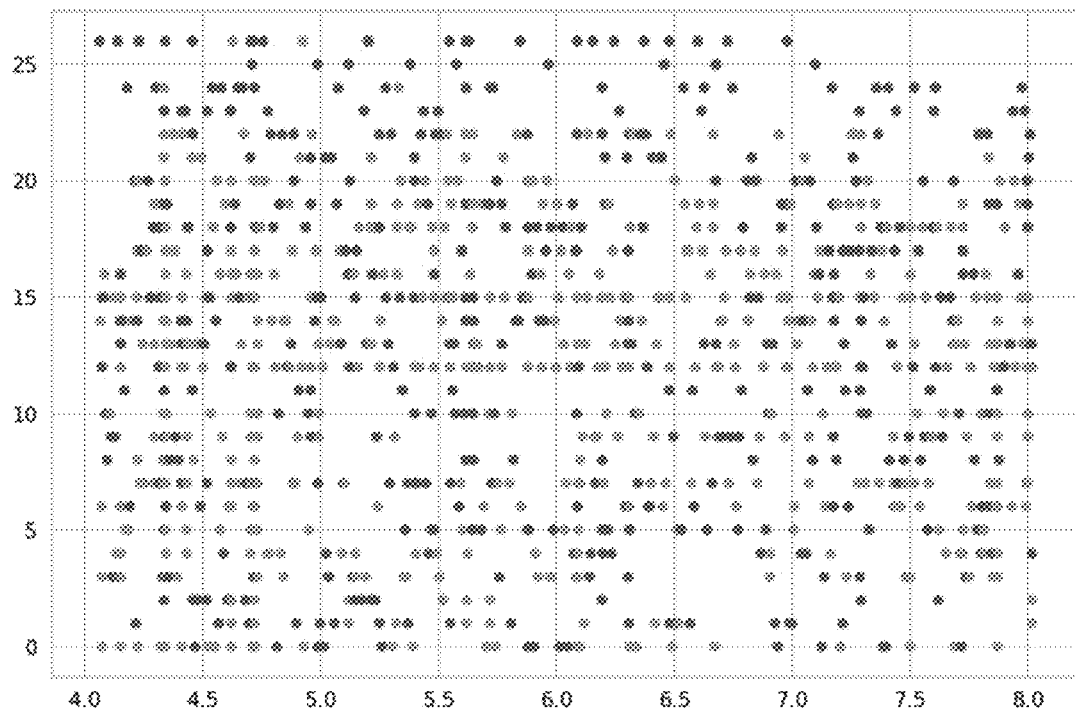
Figure 2F:
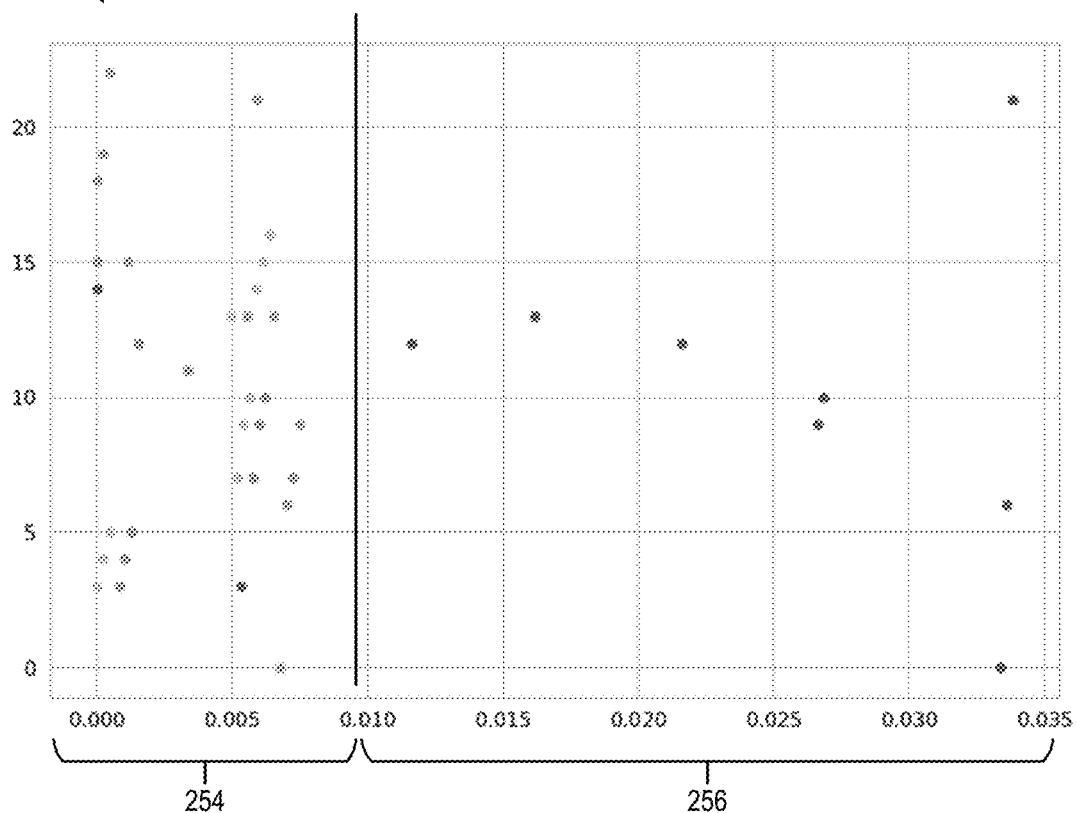

FIG. 2F illustrates an example of the processing of messages by autoencoder 220. Graph 250 is a plot of a distribution of numerical values, each representing a message, with respect to time. The messages may include normal messages and abnormal messages. Based on their times of reception, the messages can be divided into windows of ten messages, and an input vector 212 is formed for each window of messages. The input vectors 212 are then input to autoencoder 220 and reconstruction loss 236 of the input vectors are generated, which are plotted in graph 252. As shown in graph 252, the messages can be divided into two groups 254 and 256. For group 254, the reconstruction losses are below a loss threshold set at 0.01, which can indicate that messages of group 254 are normal messages. On the other hand, for group 256, the reconstruction losses are above the loss threshold of 0.01, which can indicate that messages of group 256 are abnormal messages. Based on the comparison, abnormal message detection module 204 can distinguish between normal messages and abnormal messages among the incoming messages.

Figure 3A:
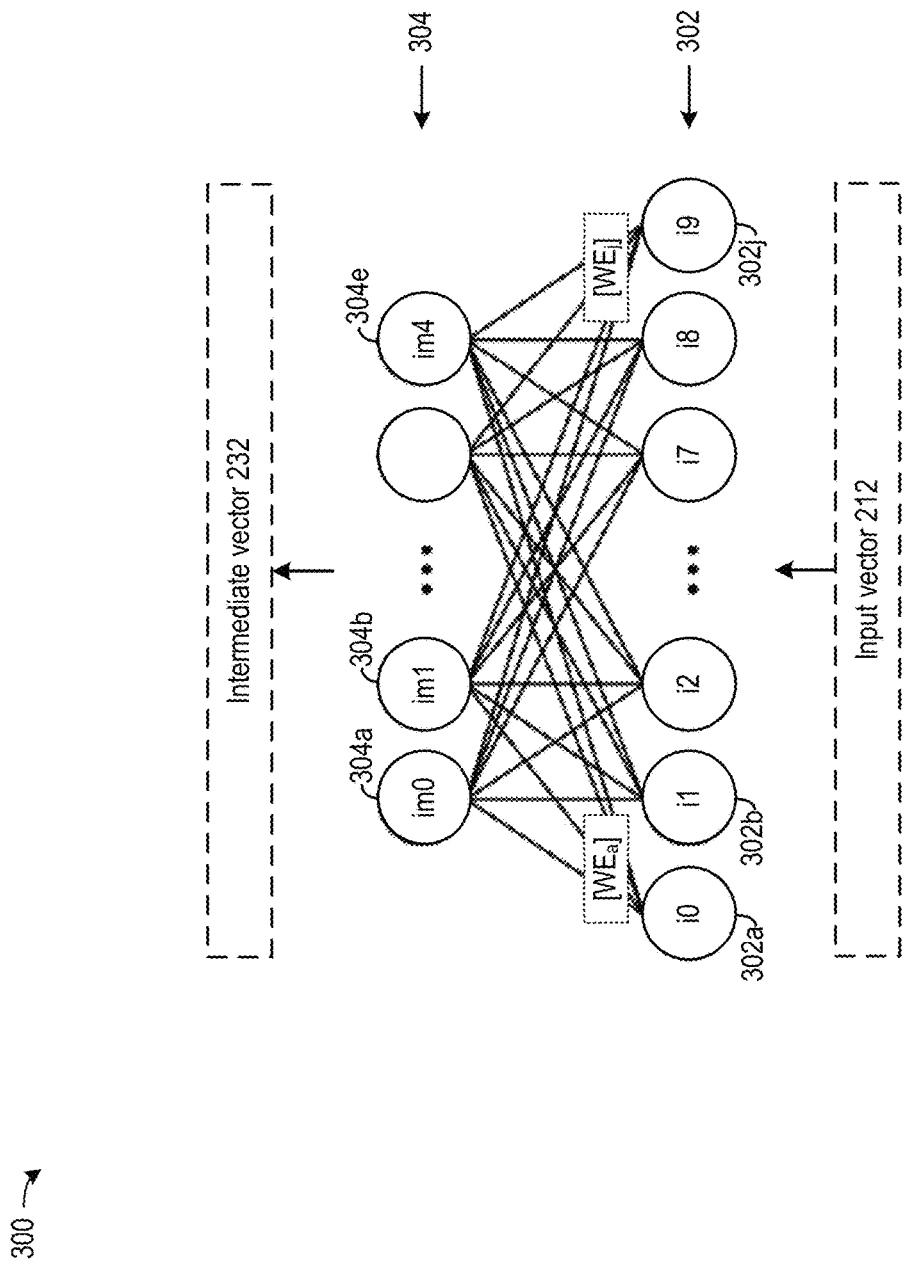
FIG. 3A and FIG. 3B illustrate examples of internal components of in-vehicle security system of FIG. 2A-FIG. 2F, according to certain embodiments.

Both encoder 226 and decoder 228 can include a neural network model, each having a set of weights which can be trained. FIG. 3A illustrates an example neural network model 300 of encoder 226. Neural network model 300 includes an input layer 302 and an output layer 304. Input layer 302 includes a plurality of nodes such as nodes 302a, 302b, and 302j. Each node of input layer 302 receives an element of input vector 212. For example, nodes 302a, 302b, and 302j receive, respectively, elements i0, i1, and i9 of input vector 212. Output layer 304 includes a plurality of nodes such as nodes 304a, 304b, and 304e. Each node of output layer 304 corresponds to an element of intermediate vector 232. For examples, nodes 304a, 304b, and 304e output, respectively, elements im0, im1, and im4 of intermediate vector 232.

Each node of input layer 302 is associated with a set of encoder weights. For example, node 302a is associated with a set of encoder weights [WE1$_a$], and node 302j is associated with a set of encoder weights [WE1$_j$]. Each node can scale an element of input vector 212 with the associated set of weights to generate a set of scaled values, and transmit the scaled values to the next layers, such as output layer 304. The encoder weights of input layer 302 can implement a mapping function that maps different elements of an input vector to each element of the intermediate vector, and each weight can define a degree of representation of each dimension in the input vector in a dimension in the intermediate vector. A larger weight can indicate that a particular element of an input vector, which corresponds to a particular message in a window, can include more important information about the features of a normal message, and therefore that particular element is well represented in the intermediate vector.

Each node of output layer 304 receives a scaled value from each node of input layer 302. Each node of output layer 304 can perform a linear operation, such as a summation operation, on the scaled values to generate an element of intermediate vector 232. For example, node 304a can compute an intermediate sum, as follows:

$$\text{sum}304a = \Sigma_{j=0}^{9}(WE_j \times i_j) \qquad \text{(Equation 1)}$$

In Equation 1, $WE_j$ can represent a weight value of each set of encoder weights (e.g., [WE1$_a$],[WE1$_n$]) used by each node of input layer 302 to scale an input element $i_j$ including elements i0-i9.

In some examples, encoder 226 may include an intermediate layer (not shown in FIG. 3A) between input layer 302 and output layer 304. Each node of the intermediate layer can implement a non-linear activation function which defines the output of that node given the input. The activation function can mimic the decision making of a biological neural network. One example of activation function may include a Rectified Linear Unit (ReLU) function defined according to the following equation:

$$ReLU(x) = \begin{cases} x \text{ for } x \geq 0 \\ 0 \text{ for } x < 0 \end{cases} \qquad \text{(Equation 2)}$$

In addition to ReLU, other forms of activation function can also be used included, for example, a softmax function, a softplus function (which can be a smooth approximation of a ReLU function), a hyperbolic tangent function (tan h), an arc tangent function (arc tan), a sigmoid function, a Gaussian function, etc.

Figure 3B:
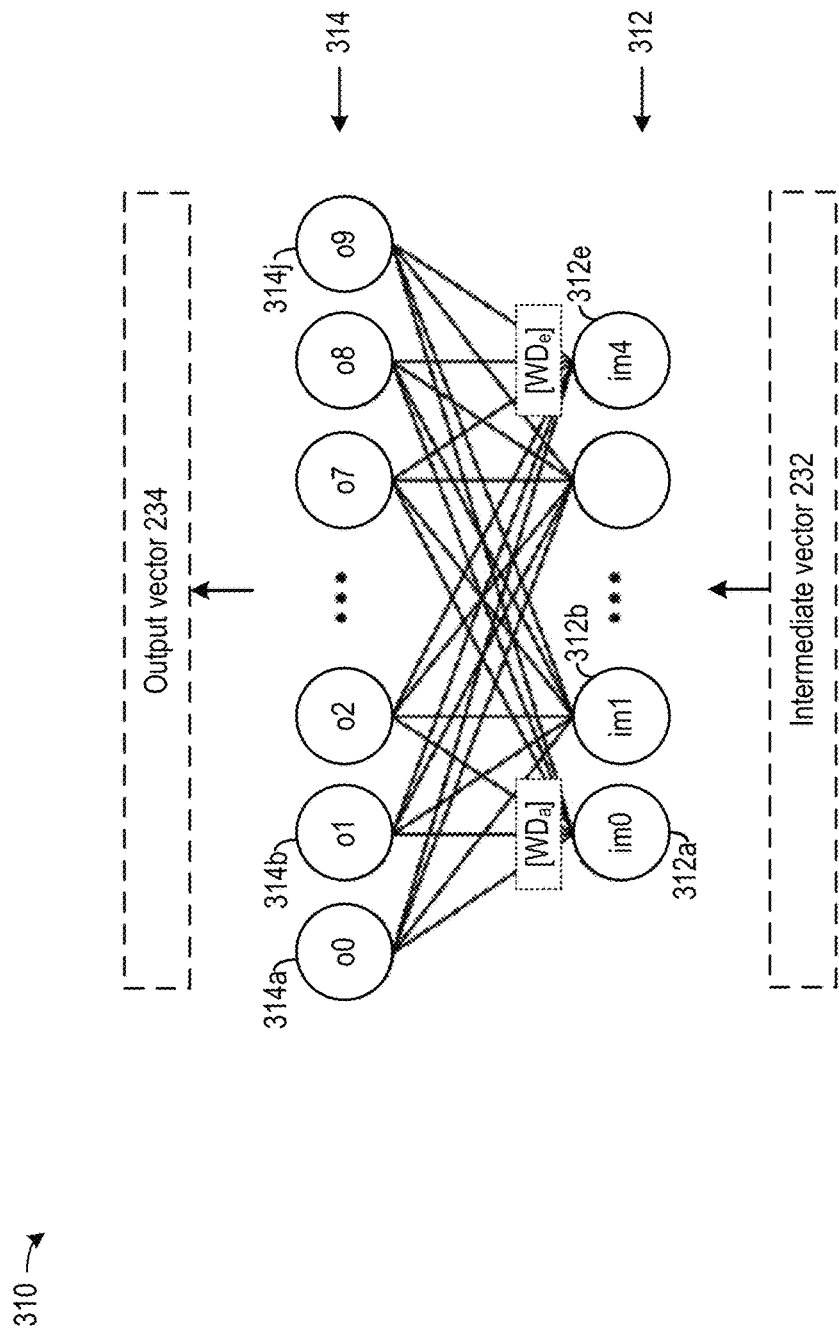

FIG. 3B illustrates an example of a neural network model 310 of decoder 228. Neural network model 310 can have a similar architecture as neural network model 300 of FIG. 3A but inverted. Neural network model 310 includes an input layer 312 and an output layer 314. Input layer 312 includes a plurality of nodes including nodes 312a, 312b, 312c, and 312e. Each of nodes 312a, 312b, and 312e correspond to an element of intermediate vector 232. Output layer 314 includes a plurality of nodes including nodes 314a, 314b, and 314j. Each of nodes 314a, 314b, and 314j correspond to an element of output vector 234.

Each node of input layer 312 is associated with a set of decoder weights. For example, node 312a is associated with a set of decoder weights [WD$_a$] and node 312e is associated with a set of decoder weights [WD$_e$]. Each node can scale the input value (an element of intermediate vector 232) with the associated set of weights to generate a set of scaled values, and transmit the scaled values to nodes of output layer 314.

Each node of output layer 314 receives a scaled value from each node of input layer 312, and sum the scaled values based on Equation 1 to generate an intermediate sum. In some examples, the intermediate sum can then be processed using a non-linear activation function (e.g., ReLU) to generate an element of the next layer. Such process can be repeated for next layers, and finally to output vector 234.

The encoder weights [WE] and decoder weights [WD] of autoencoder 220 can be trained in an unsupervised training operation and based on a training set of normal messages. The encoder weights [WE] and decoder weights [WD] can be trained based on a set of normal messages that such that input vectors representing the normal messages can be encoded and then reconstructed with a minimum/reduced reconstruction loss, while input vectors that deviate from the normal messages can be encoded and then reconstructed with increased reconstruction loss.

Figure 4A:
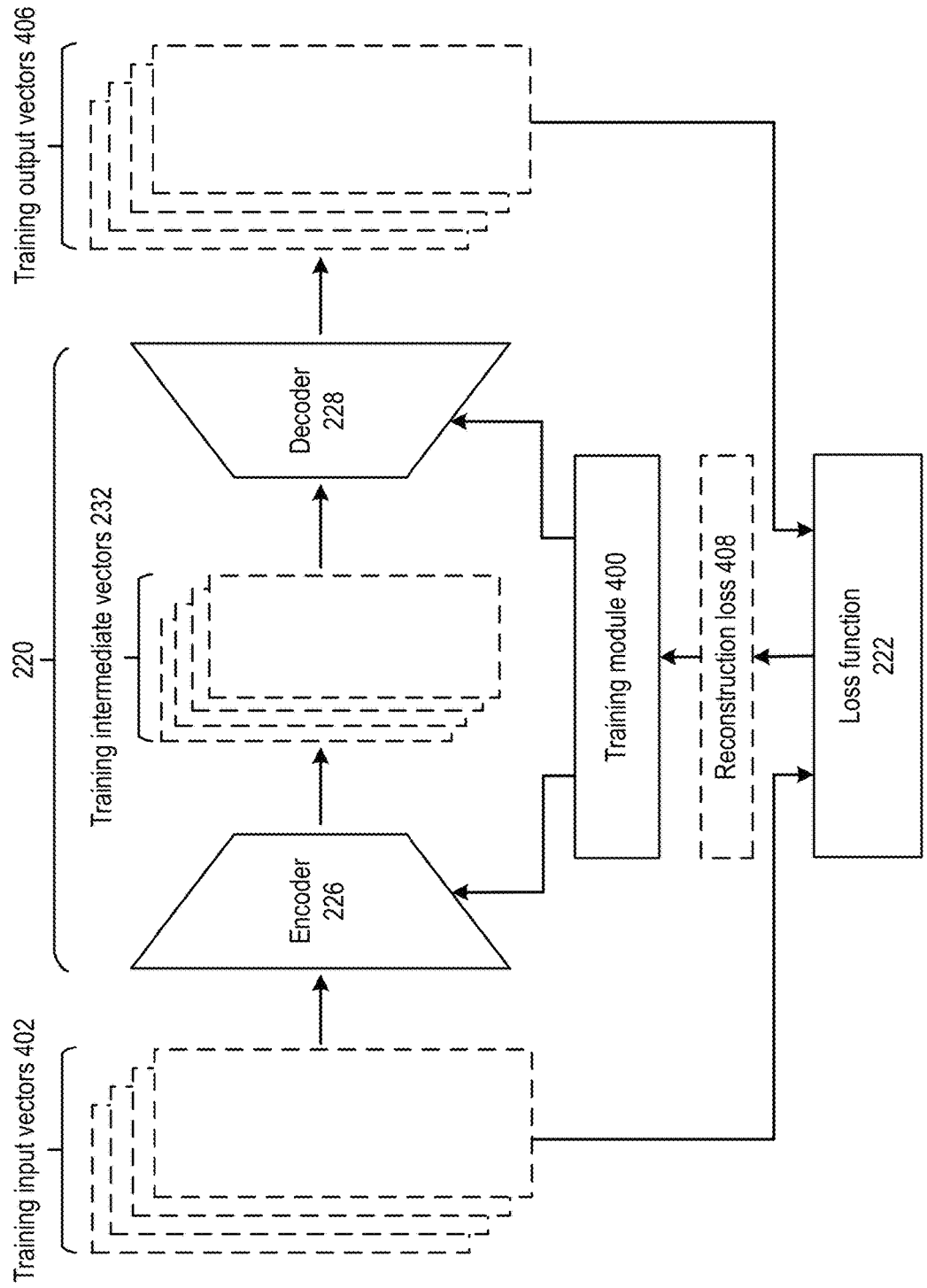
FIG. 4A, FIG. 4B, and FIG. 4C illustrate examples of a training operation for the in-vehicle security system of FIG. 2A-FIG. 2F, according to certain embodiments.
Figure 4B:
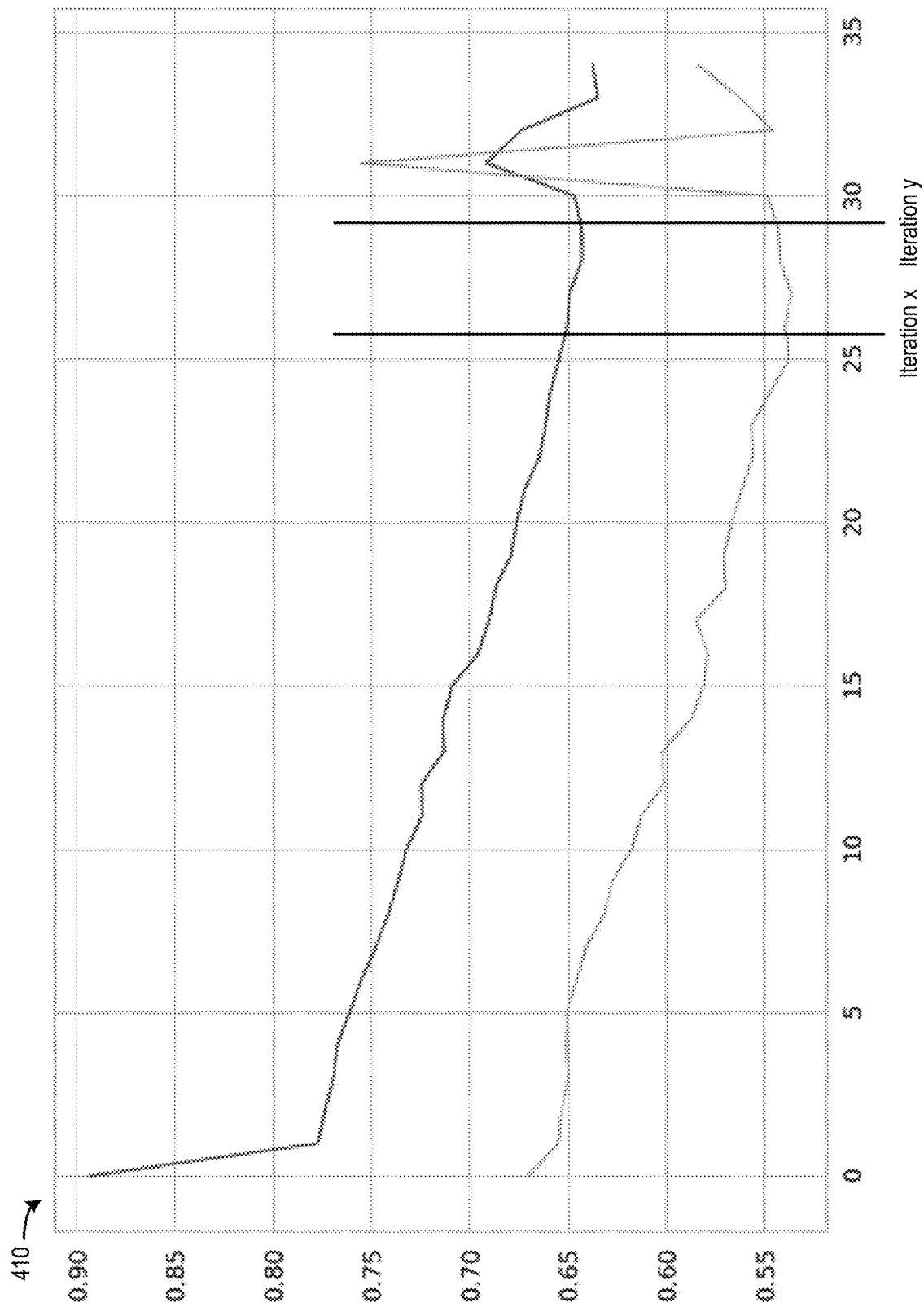
Figure 4C:
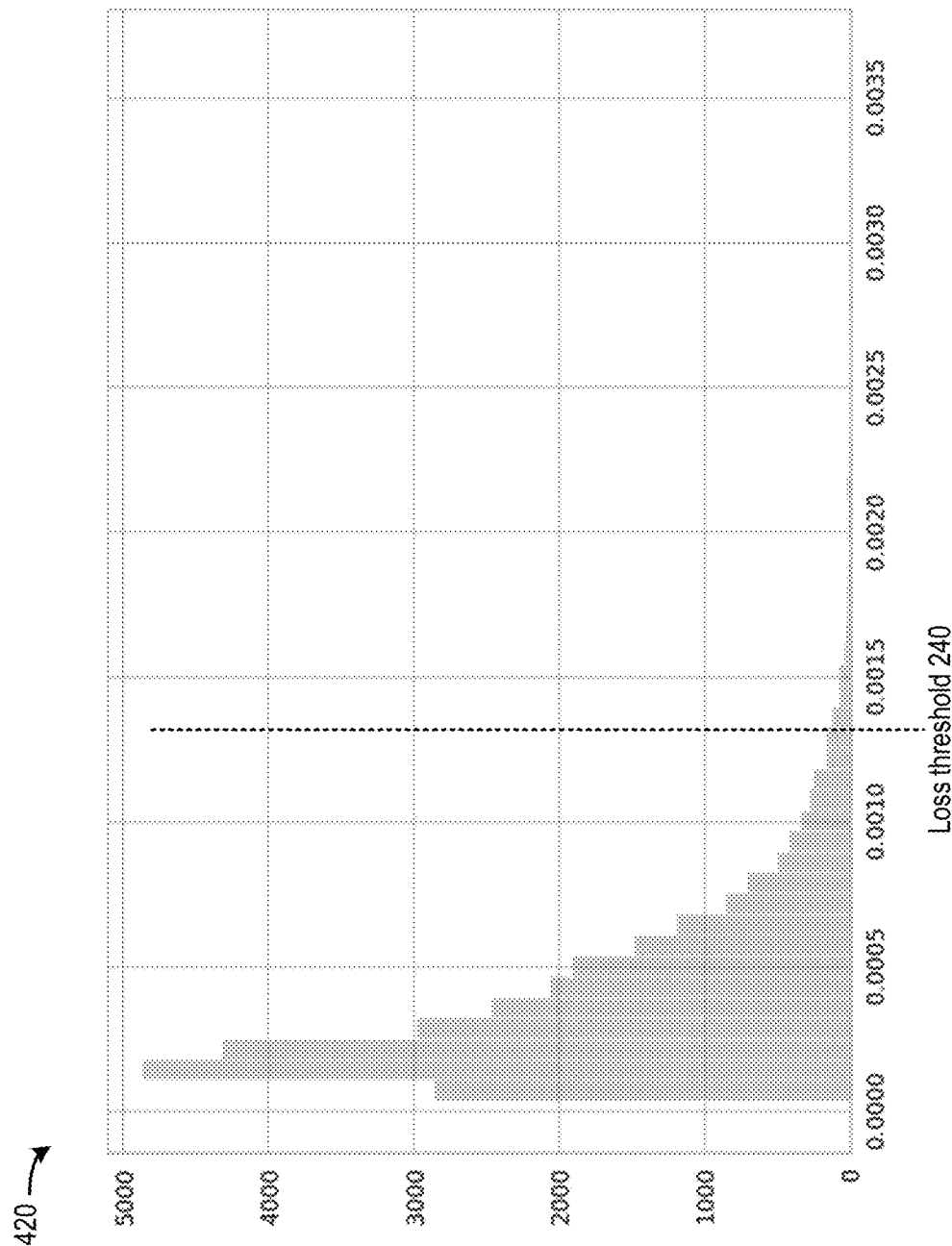

FIG. 4A-FIG. 4C illustrate an example of an unsupervised training operation. The unsupervised training operation can include a forward propagation operation and a backward propagation operation. The training operation can be performed by a training module 400 that interfaces with autoencoder 220. As part of the forward propagation operation, a set of training input vectors 402, which represents a training set of normal messages, can be input to autoencoder 220 to generate a corresponding set of training intermediate vectors 422 and a corresponding set of training output vectors 424. The set of training input vectors 402 can be generated, based on the example scheme shown in FIG. 2C, from normal messages captured from the CAN buses of one or more vehicles during the normal operations of the vehicles. A vehicle can be determined to be in normal operations when the vehicle is known to be not receiving any abnormal messages, or that no abnormal messages are being transmitted over the CAN buses of the vehicle.

Encoder 226 can apply an initial set of encoder weights [WE] on training input vectors 402 to generate training intermediate vectors 404, whereas decoder 228 can apply an initial set of decoder weights [WD] on training intermediate vectors 404 to generate a corresponding set of training output vectors 404. Training input vectors 402 and training output vectors 406 can then be forwarded to loss function 222, which can compute a reconstruction loss 408 between each training input vector 402 and its corresponding training output vector 406.

As part of the backward propagation operation, training module 400 can adjust the initial set of decoder weights [WD], and the initial set of encoder weights [WE], to reduce the combined reconstruction loss 408 between training input vectors 402 and training output vectors 406. The adjustment can be based on a gradient descent scheme, in which a degree of adjustment of the weights are based on a gradient of the combined reconstruction loss 408 with respect to the weights.

During the training, the weights of the encoders and the decoders can be iteratively adjusted in multiple iterations of forward propagation and backward propagation operations to reduce the reconstruction loss. FIG. 4B illustrates a graph 410 of the change of combined reconstruction loss 408 for each iteration of forward and backward propagation operations. As shown in FIG. 4B, combined reconstruction loss 408 reduces for each iteration of forward propagation and backward propagation operations until, for example, at iteration x. Beyond iteration x, the combined reconstruction loss 408 may plateau (e.g., stops decreasing or stays within a certain range between iterations x and y) or increase (after iteration y). Upon detecting that the combined reconstruction loss 408 plateaus or increases, training module 400 can stop the training operation and provide the encoder and decoder weights from iteration x as the trained weights for normal message detection.

In addition, the reconstruction loss threshold 240 for generation of detection output 214, as shown in FIG. 2D, can also be generated based on the training input vectors 402 after the training completes. Specifically, a distribution of reconstruction losses among the training input vectors 402 can be determined, and the reconstruction loss threshold 240 that indicates a message (or a plurality of messages) is abnormal can be determined based on the distribution. FIG. 4C illustrates an example distribution 420 of reconstruction losses. A reconstruction loss threshold 240 can be determined from distribution 420 such that, for example, the reconstruction loss for 98% of the training input vectors 402 is below the threshold.

Figure 5A:
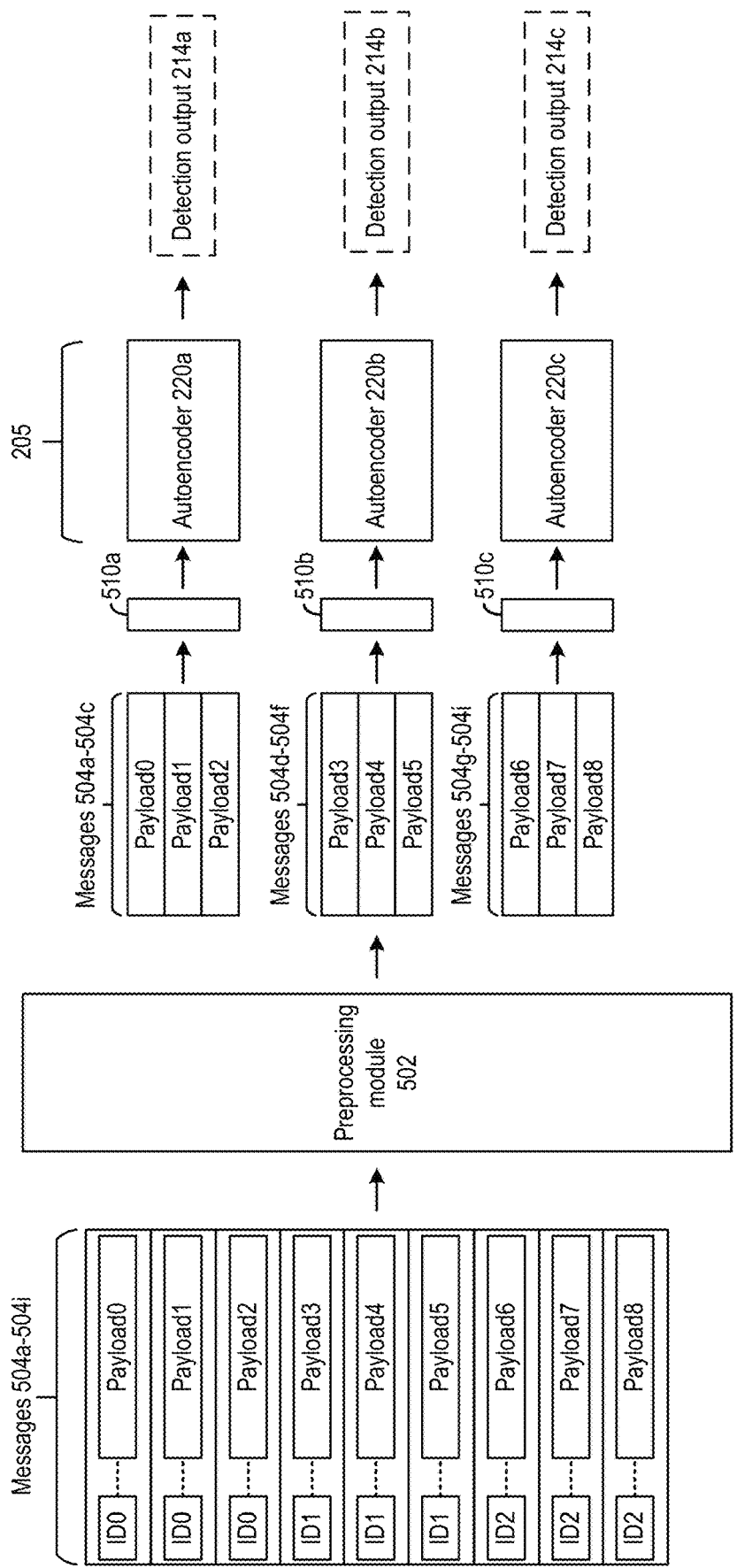
FIG. 5A, FIG. 5B, and FIG. 5C illustrate examples of internal components of in-vehicle security system of FIG. 2A-FIG. 2F, according to certain embodiments.
Figure 5B:
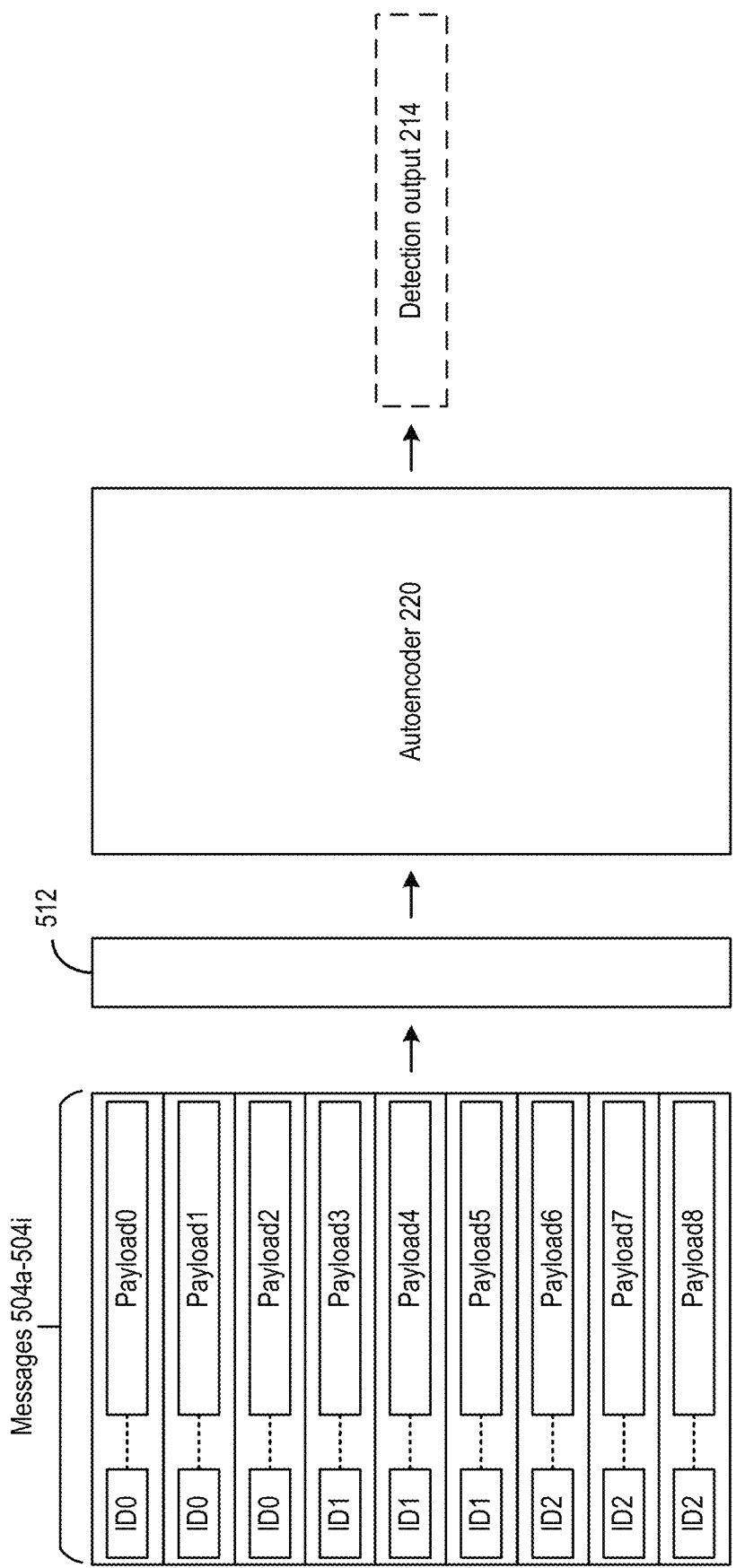

FIG. 5A and FIG. 5B illustrate examples of arrangements of autoencoder 220 in abnormal message detection module 204. In FIG. 5A, machine learning model 205 includes multiple autoencoders 220, including autoencoders 220a, 220b, 220c, with each autoencoder associated with a particular arbitration identifier. Each autoencoder can be trained using the aforementioned unsupervised training operation of FIG. 4A and based only on normal messages having the associated arbitration identifier. For example, autoencoder 220a can be associated with the arbitration identifier ID0 and is trained using normal messages having the arbitration identifier ID0. Moreover, autoencoder 220b can be associated with the arbitration identifier ID1 and is trained using normal messages having the arbitration identifier ID1. Further, autoencoder 220c can be associated with the arbitration identifier ID2 and is trained using normal messages having the arbitration identifier ID2.

In FIG. 5A, abnormal message detection module 204 further includes a preprocessing module 502, which can be part of input vector generation module 202, to select an autoencoder to process the incoming messages 504 based on the arbitration identifiers of the messages. In the example of FIG. 5A, preprocessing module 502 can select messages 504a-504c having the arbitration identifier ID0 to form an input vector 510a, and forward input vector 510a to autoencoder 220a to generate detection output 214a. Moreover, preprocessing module 502 can select messages 504d-504f having the arbitration identifier ID1 to form an input vector 510b, and forward input vector 510b to autoencoder 220b to generate detection output 214b. Further, preprocessing module 502 can select messages 504g-504i having the arbitration identifier ID2 to form an input vector 510c, and forward input vector 510c to autoencoder 220c to generate detection output 214c. In FIG. 5A, each of input vectors 510a, 510b, and 510c can include the payload data of the messages, while the arbitration identifiers can be omitted from the input vectors, as input vectors from messages of different arbitration identifiers are processed with different autoencoders.

Figure 5C:
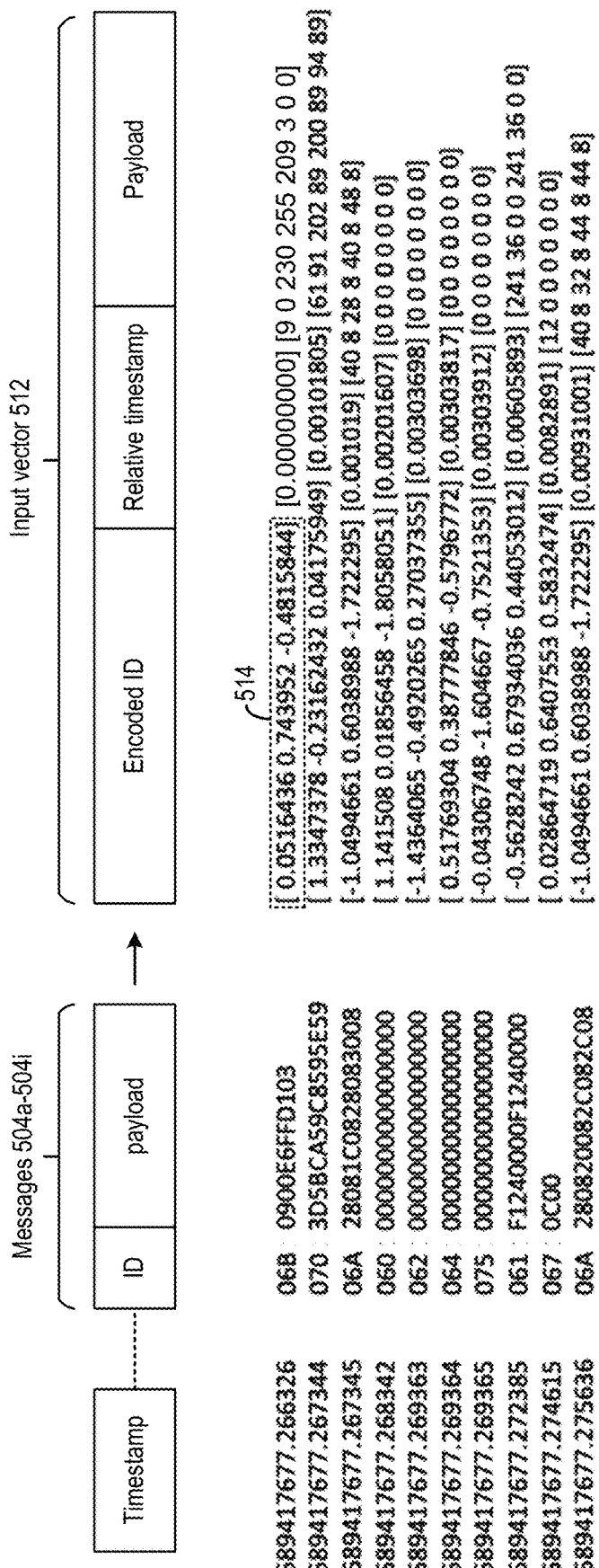

FIG. 5B and FIG. 5C illustrate another example arrangement of autoencoder 220 in abnormal message detection module 204. As shown in FIG. 5B, machine-learning model 205 may include an autoencoder 220 trained to process incoming messages having different arbitration identifiers. Autoencoder 220 can be trained as a one-fits-all model to detect abnormal messages having different arbitration identifiers. Specifically, an input vector 512 can be generated from messages 504a-504i including a sequence of features comprising arbitration identifiers and payload data. Autoencoder 220 can process input vector 512 and generate a detection output 214 to indicate whether messages 504a-

504*i* are normal messages or abnormal messages. Autoencoder 220 can be trained based on a training set of normal messages having different arbitration identifiers. In such an example, the autoencoder can be trained to learn about sequences of normal message features comprising sequences/combinations of arbitration identifiers and payload data, and to perform the encoding and decoding operations based on detecting the sequences of normal message features.

The arrangements of FIG. 5B enable autoencoder 220 to detect additional potential threats. In one example, an adversary may inject malicious messages that have the same characteristics (e.g., payloads) as normal messages. In another example, an adversary may inject a small number of malicious messages for each arbitration identifier (e.g., for different target ECUs). The percentage of malicious messages for each arbitration identifier may be small, but the malicious messages with different arbitration identifiers altogether may lead to serious consequences, such as multipole ECUs being attacked at the same time. For both examples, autoencoder 220 can be trained to detect sequences of different arbitration identifiers and payloads in normal message traffic, and can detect abnormal messages when, for example, it detects a sequence of arbitration identifiers and payloads different from the sequences in normal messages which autoencoder 220 has learnt from the training operation.

FIG. 5C illustrates additional features that can be included in input vector 512 to improve the accuracy of detection of normal/abnormal messages. As shown in FIG. 5C, each element of an input vector 512, representing a message, can include a vector including an encoded arbitration identifier, a relative timestamp, and a payload. Therefore, each element of an input vector can be mapped to multiple input nodes of encoder 226, while each element of an output vector can be mapped to multiple output nodes of decoder 228. Encoded arbitration identifier can include a multi-dimensional identifier vector (e.g., a three-dimensional identifier vector 514 as shown in FIG. 5C) generated by mapping a range of arbitration identifiers to a multi-dimensional space. The objective of mapping is such that vectors representing different arbitration identifiers are generally of equal distance from each other within the multi-dimensional space irrespective of the actual numerical values of the arbitration identifiers. Such arrangements can ensure that the compression of arbitration identifier information in the intermediate vectors, as well as the detection of patterns of arbitration identifiers, are not skewed by high-value arbitration identifiers. In addition, the relative timestamp can also provide additional feature points to distinguish between different sequences of messages. For example, during normal operation each message of a certain message sequence may be separated by a certain interval, but when sent by an adversary the messages may be separated by a much shorter interval, even though the messages have the same sequence of payloads and arbitration identifiers. By including the relative timestamps as features of the messages, autoencoder 220 can determine that a sequence of messages is abnormal based on detecting, for example, reduced relative timestamps.

Figure 6A:
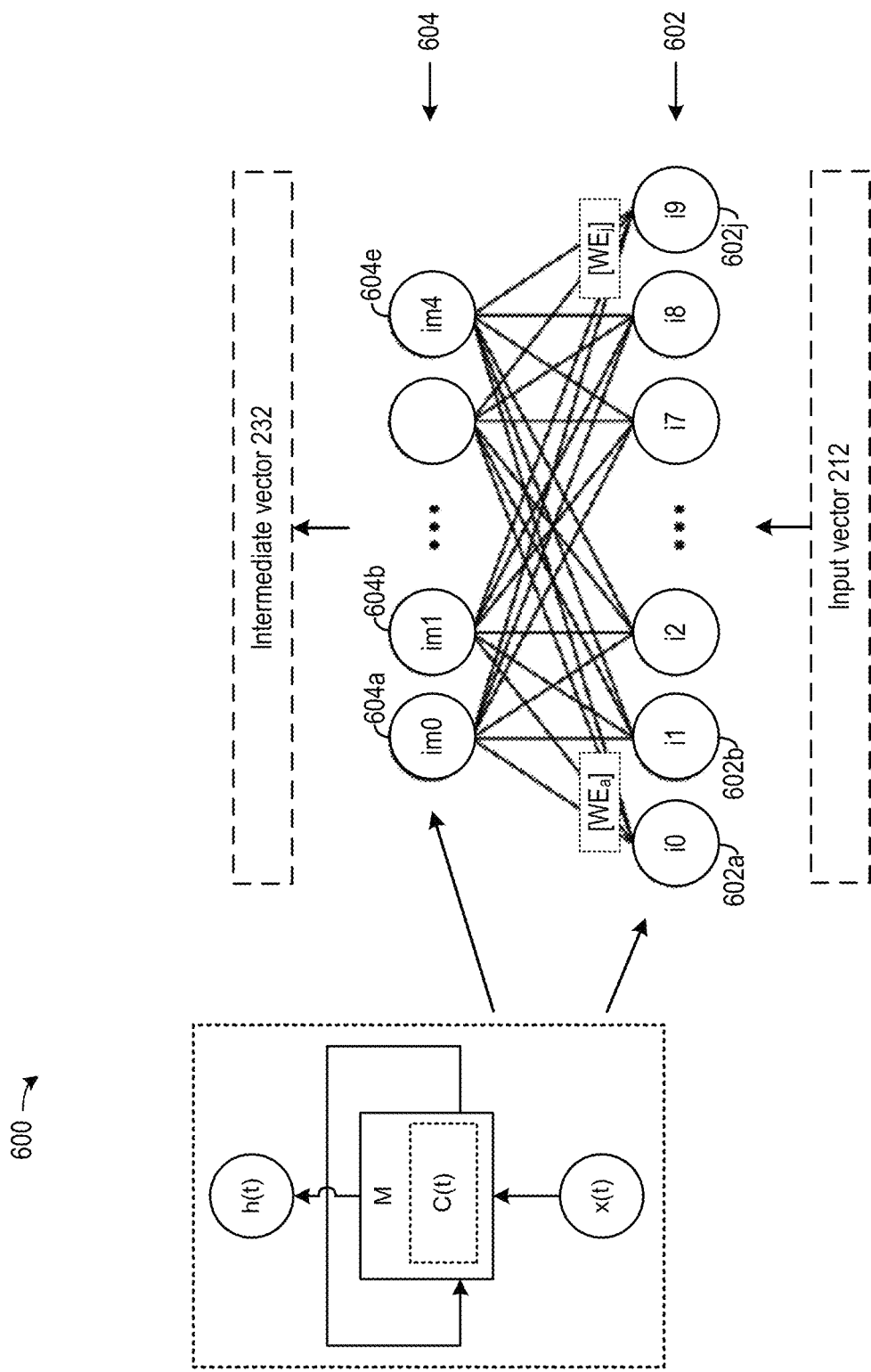
FIG. 6A and FIG. 6B illustrate examples of internal components of in-vehicle security system of FIG. 2A-FIG. 2F, according to certain embodiments.
Figure 6B:
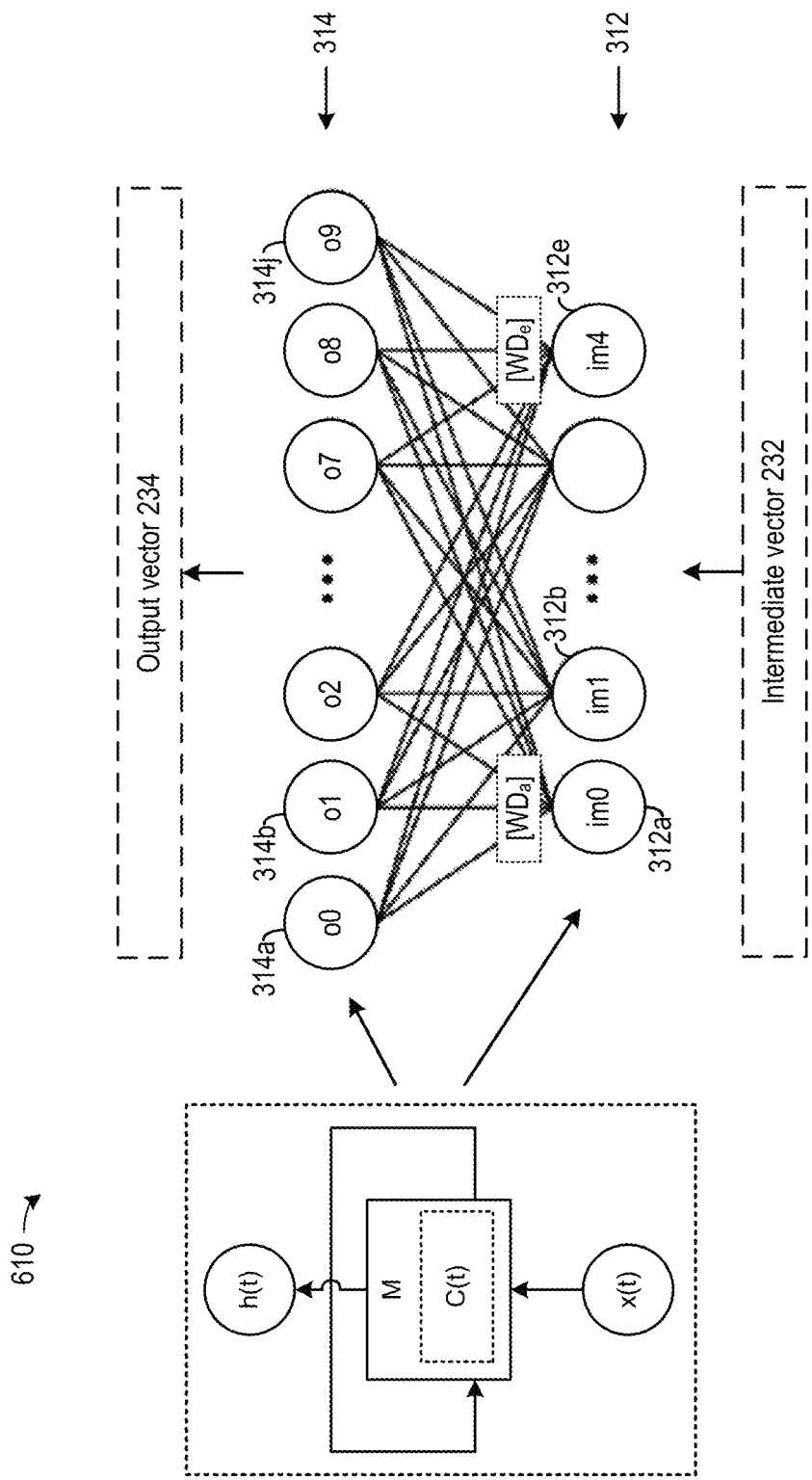

In some examples, to improve the learning of normal message features from long sequences of messages having different arbitration identifiers, each of the encoder and the decoder of the autoencoder may include a recurring neural network which can generate outputs based on a history of prior outputs. FIG. 6A and FIG. 6B illustrate examples of recurring neural networks 600 and 610 that can be part of, respectively, encoder 226 and decoder 228 including a recurring neural network. As shown in FIG. 6A, each node of input layer 602 (e.g., node 602*a*, node 602*b*) and of output layer 604 (e.g., node 604*a*, node 604*b*) can include a memory M which can store a state C which reflects a history of prior inputs/outputs. At a time t, each input node of input layer 602 can receive an input X(t), such as an element of input vector 212 received at time t, and combine the input with the state at time t (C(t)) to generate an output h(t). The input node also updates the state C based on input X(t), output h(t), or a combination of both. Each input node also scales its output h(t) with encoder weights [WE] and transmits the scaled outputs h(t) to each output node of output layer 304. Each output node of output layer 604 also maintains a state C(t) and generates an output (e.g., an element of intermediate vector 232) based on the scaled output h(t) from input layer 602, as well as its state C(t). Each output node further updates its state based on the input, the output, or a combination or both. Recurring neural network 610 of FIG. 6B, which can implement decoder 228, operates in the same way as the recurring neural network 600 of FIG. 6A.

Various recurring network topologies can be used in recurring neural networks 600 and 610, such as a long short term memory (LSTM) network. In LSTM, the influence of prior inputs and outputs on the generation of current output can be trained or configured to selectively remove or deemphasize certain prior inputs/outputs from the state, which can prevent those inputs/outputs from losing influence on the current output due to a gap in the time.

Using a recurrent network can improve the performance of the autoencoder in detecting abnormal messages having different arbitration identifiers, especially in cases where the CAN buses are expected to transmit long sequences of messages having different arbitration identifiers. Specifically, as the encoder uses a limited number of elements to represent the intermediate vector, which can represent the compressed information of detected sequence of normal/abnormal messages, the length of the normal/abnormal message sequence that can be represented and detected is limited by the number of elements of the intermediate vector. By including a memory element in the neural network nodes, the encoding and decoding operation of a message can be influenced by a history of prior messages, which can expand the sequence of messages represented in the intermediate vectors as well as in the decoder outputs. Such arrangements allow the autoencoder to perform normal/abnormal message detection more accurately in long sequences of messages.

Method

Figure 7:
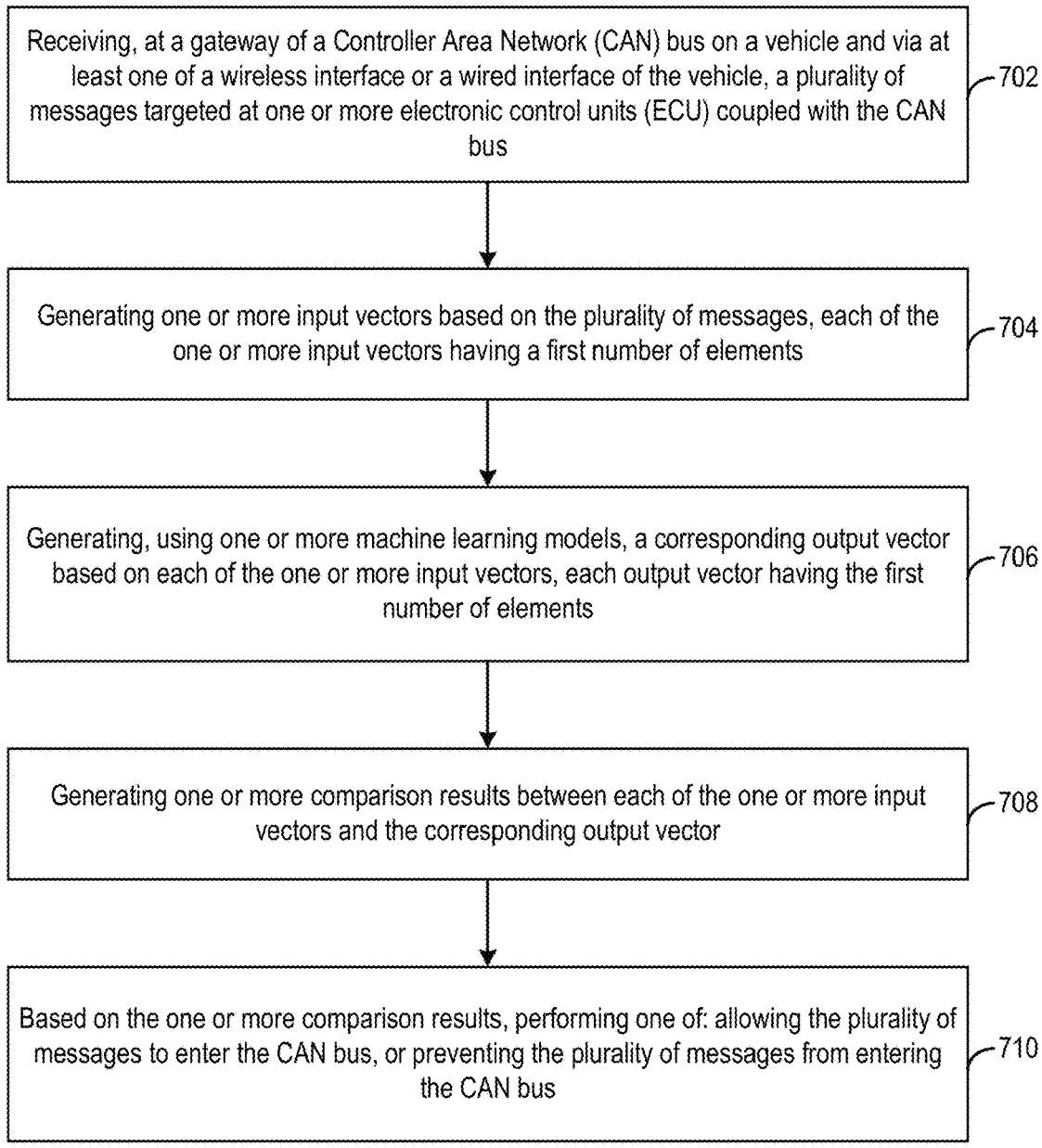
FIG. 7 illustrates a flow chart of an example of a method for detecting intrusion at an in-vehicle network, according to certain embodiments.

FIG. 7 illustrates a flowchart of a method 700 of detecting and handling abnormal messages. Method 700 can be performed by, for example, in-vehicle network security system 200 of FIG. 2A.

In step 702, in-vehicle network security system 200 receives, at a gateway of a Controller Area Network (CAN) bus on a vehicle and via at least one of a wireless interface or a wired interface of the vehicle, a plurality of messages targeted at one or more electronic control units (ECU) coupled with the CAN bus. The wireless interface and the wired interface may include, for example, a V2X communication interface, a Bluetooth interface, an USB interface, etc. Each message may include an arbitration ID and payload data.

In step 704, in-vehicle network security system 200 generates one or more input vectors based on the plurality of messages, each of the one or more input vectors having a first number of elements. In some examples, an input vector can be generated from a window of messages, with each element of the input vector corresponding to a message within the window of messages. In some examples, each element of the input vector can include the payload data of the corresponding message, as shown in FIG. 2C. In some examples, each element of the input vector can include the arbitration identifier, the payload, and timestamp information of the corresponding message. The arbitration identifier can be represented by a multi-dimensional identifier vector, as shown in FIG. 5C. In some examples, each input vector can be generated from non-overlapping windows of messages. In some examples, as shown in FIG. 2D, each input vector can be generated from overlapping windows of messages, such that different input vectors can include elements representing the same message(s).

In step 706, in-vehicle network security system 200 generates, using one or more machine learning models, a corresponding output vector based on each of the one or more input vectors, each output vector having the first number of elements (same number of elements as the corresponding input vector). In some examples, the one or more machine learning models comprises a plurality of autoencoders, such as autoencoders 220a, 220b, 220c, etc., of FIG. 5A, with each autoencoder being associated with a particular arbitration ID and trained, based on normal messages having the particular arbitration ID, to detect abnormal messages having that arbitration ID. In some examples, the one or more machine learning models comprises an autoencoder 220 of FIG. 5B, which can be trained as a one-fits-all model to detect abnormal messages having different arbitration identifiers. In such example, the autoencoder can be trained to learn normal message features comprising sequences of arbitration IDs, payload data, relative timestamps, etc., and to detect abnormal messages having a sequence of arbitration IDs, payload data, and relative timestamps that are different from those of the normal messages. In some examples, the one-fits-all autoencoder may include a recurring network, such as a long short term memory (LSTM) network, to process a long sequence of input vectors representing a long sequence of messages. In both cases, the autoencoder can receive an input vector, generate, for each input vector, a corresponding intermediate vector having a reduced dimension compared with the input vector, and reconstruct the output vector from the intermediate vector.

In step 708, in-vehicle network security system 200 generates one or more comparison results between each of the one or more input vectors and the corresponding output vector. The comparison results can include, for example, a reconstruction loss based on a square mean error between each input vector and the corresponding output vector.

In step 710, based on the one or more comparison results, in-vehicle network security system 200 performs one of: allowing the plurality of messages to enter the CAN bus, or preventing the plurality of messages from entering the CAN bus. For example, as shown in FIG. 2F, if the combined reconstruction loss of the plurality of messages exceeds a reconstruction loss threshold, in-vehicle network security system 200 can determine that the plurality of messages include abnormal messages and can prevent the messages from entering the CAN bus. On the other hand, if the combined reconstruction loss is below the reconstruction loss threshold, in-vehicle network security system 200 can determine that the plurality of messages are normal messages and allow the messages to enter the CAN bus to reach the one or more target ECUs.

Computer System

Figure 8:
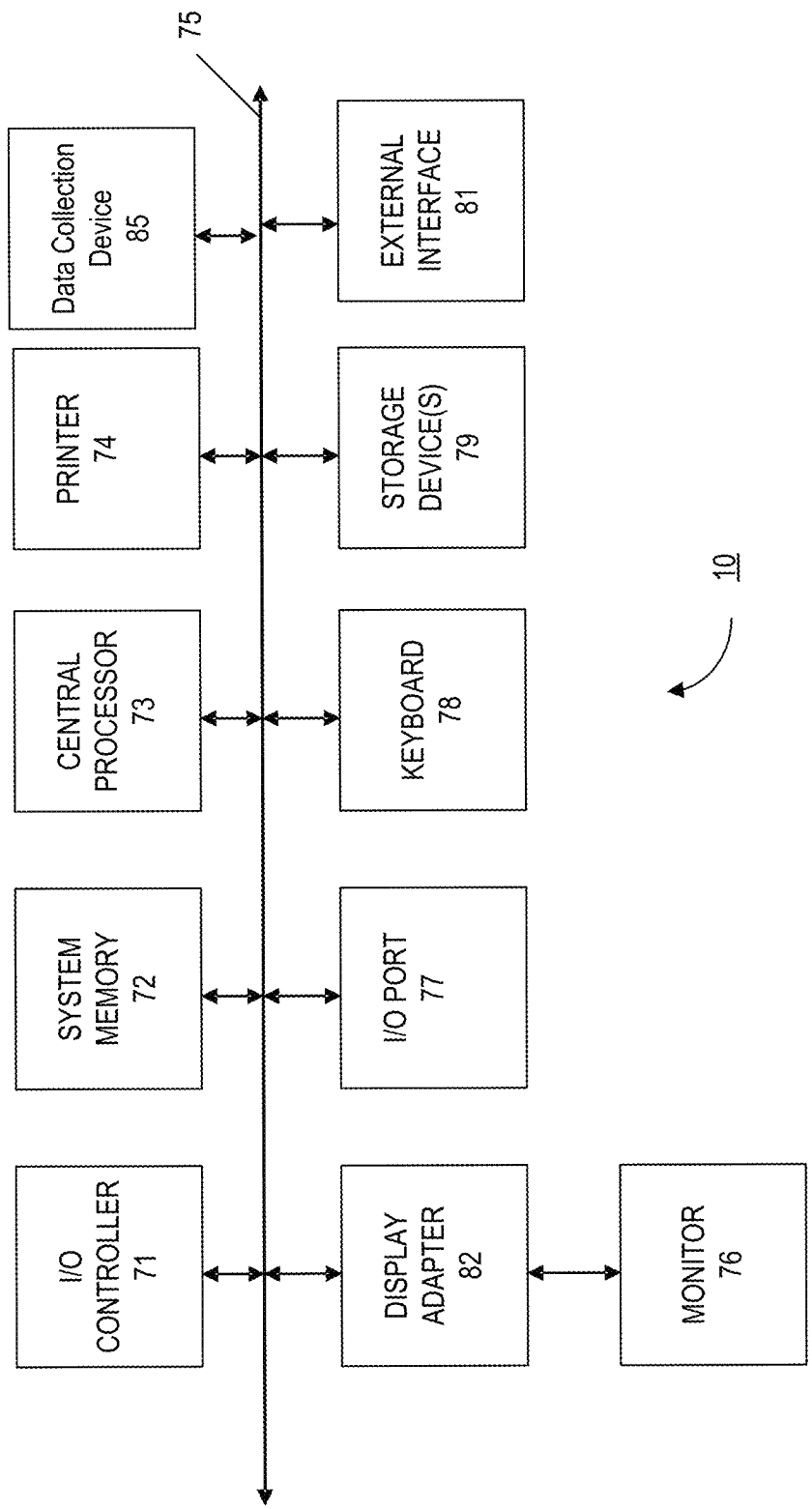
FIG. 8 illustrates an example computer system that may be utilized to implement techniques disclosed herein.

Any of the computer systems mentioned herein may utilize any suitable number of subsystems. Examples of such subsystems are shown in FIG. 8 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices. In some embodiments, a cloud infrastructure (e.g., Amazon Web Services), a graphical processing unit (GPU), etc., can be used to implement the disclosed techniques, including the techniques described from FIG. 1-FIG. 7.

The subsystems shown in FIG. 8 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire). For example, I/O port 77 or external interface 81 (e.g. Ethernet, Wi-Fi) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81 or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic-using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer-readable medium can include random access memory (RAM), a read-only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices.

Such programs may also be encoded and transmitted using carrier signals adapted for transmission via wired, optical, and/or wireless networks conforming to a variety of protocols, including the Internet. As such, a computer-readable medium may be created using a data signal encoded with such programs. Computer-readable media encoded with the program code may be packaged with a compatible device or provided separately from other devices (e.g., via Internet download). Any such computer-readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a," "an," and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A method, comprising:
receiving, at a gateway of a Controller Area Network (CAN) bus on a vehicle and via at least one of a wireless interface or a wired interface of the vehicle, a plurality of messages targeted at one or more electronic control units (ECU) coupled with the CAN bus;
generating one or more input vectors based on the plurality of messages, each of the one or more input vectors having a first number of elements;
generating, using one or more machine learning models, a corresponding output vector based on each of the one or more input vectors, each output vector having the first number of elements;
generating one or more comparison results between each of the one or more input vectors and the corresponding output vector; and
based on the one or more comparison results, performing one of: allowing the plurality of messages to enter the CAN bus or preventing the plurality of messages from entering the CAN bus,
wherein each of the plurality of messages includes an arbitration identifier and a payload,
wherein the one or more input vectors are generated based on both the arbitration identifier and the payload of each of the plurality of messages,
wherein the one or more machine learning models comprise a plurality of encoders and corresponding decoders,
wherein generating, using one or more machine learning models, a corresponding output vector based on each of the one or more input vectors comprises:
transforming, using the one or more encoders, each of the one or more input vectors to a corresponding intermediate vector, the intermediate vector having a second number of elements, the second number being smaller than the first number; and
reconstructing, using the one or more corresponding decoders, the one or more output vectors from the corresponding one or more intermediate vectors,
wherein the one or more comparison results comprise a combined reconstruction loss between the one or more input vectors and the corresponding one or more output vectors; and
wherein the plurality of messages is prevented from entering the CAN bus based on the combined reconstruction loss exceeding a threshold;
wherein each corresponding pair of encoder and decoder is trained based on a training set of only normal messages having an associated arbitration identifier, the training set of normal messages received from one or more vehicles during normal operations of the one or more vehicles;

wherein the training is an unsupervised training operation;
wherein the one or more encoders comprises a plurality of encoders, each encoder being associated with a distinct arbitration identifier included in the plurality of messages;
wherein the one or more decoders comprises a plurality of decoders, each decoder being associated with the distinct arbitration identifier of the corresponding encoder;
wherein each element of the one or more input vectors is generated based on the payload of a message of the plurality of messages; and
wherein generating, using one or more machine learning models, an output vector based on each of the plurality of input vectors comprises, for each input vector of the plurality of input vectors comprises:
 selecting a corresponding pair of encoder and decoder from, respectively, the plurality of encoders and the plurality of decoders based on the distinct arbitration identifier of the input vector; and
 generating the output vector for the input vector using the selected pair of encoder and decoder.

2. The method of claim 1, further comprising: transforming the arbitration identifier of each of the plurality of messages to a multi-dimensional identifier vector; wherein each element of the one or more input vectors is generated based on the payload and the identifier vector of the arbitration identifier of a message of the plurality of messages.

3. The method of claim 2, further comprising:
determining, for each message of the plurality of messages, a timestamp representing a time when the message is received; and
wherein each element of the one or more input vectors is generated based on the payload, the identifier vector, and the timestamp of a message of the plurality of messages.

4. The method of claim 1 wherein
the vehicle includes a network security system which stores information indicative of features of prior normal messages on the CAN bus during a normal operation of a vehicle when the vehicle is not under any kind of network intrusion and there is no malicious message being transmitted on the CAN bus.

5. The method of claim 1 wherein the threshold is 0.01 or less.

6. The method of claim 1 further comprising:
using dimensionality reduction to generate a representation of the normal messages features of input vectors to form the intermediate vectors, wherein the dimensionality reduction removes noise information.

7. The method of claim 1 wherein
the encoders include a first neural network having a first set of weights;
the decoders include a second neural network having a second set of weights; and
the weights of the encoders and the decoders can be iteratively adjusted to reduce the reconstruction loss for normal messages until the reconstruction loss reaches a minimum.

8. The method of claim 7 further comprising:
adjusting the decoder weight, and the encoder weights to reduce the combined reconstruction loss between training input vectors and training output vectors, wherein the adjustment is based on a gradient descent scheme, in which a degree of adjustment of the weights are based on a gradient of the combined reconstruction loss with respect to the weights.

9. An apparatus comprising:
a memory that stores a set of instructions; and
a hardware processor configured to execute the set of instructions to:
receive, at a gateway of a Controller Area Network (CAN) bus on a vehicle and via at least one of a wireless interface or a wired interface of the vehicle, a plurality of messages targeted at one or more electronic control units (ECU) coupled with the CAN bus;
generate one or more input vectors based on the plurality of messages, each of the one or more input vectors having a first number of elements;
generate, using one or more machine learning models, a corresponding output vector based on each of the one or more input vectors, each output vector having the first number of elements;
generate one or more comparison results between each of the one or more input vectors and the corresponding output vector; and
based on the one or more comparison results, perform one of: allowing the plurality of messages to enter the CAN bus or preventing the plurality of messages from entering the CAN bus,
wherein each of the plurality of messages includes an arbitration identifier and a payload,
wherein the one or more input vectors are generated based on both the arbitration identifier and the payload of each of the plurality of messages,
wherein the one or more machine learning models comprise a plurality of encoders and corresponding decoders,
wherein generate, using one or more machine learning models, a corresponding output vector based on each of the one or more input vectors comprises:
 transforming, using the one or more encoders, each of the one or more input vectors to a corresponding intermediate vector, the intermediate vector having a second number of elements, the second number being smaller than the first number; and
 reconstructing, using the one or more corresponding decoders, the one or more output vectors from the corresponding one or more intermediate vectors,
wherein the one or more comparison results comprise a combined reconstruction loss between the one or more input vectors and the corresponding one or more output vectors; and
wherein the plurality of messages is prevented from entering the CAN bus based on the combined reconstruction loss exceeding a threshold;
wherein each corresponding pair of encoder and decoder is trained based on a training set of only normal messages having an associated arbitration identifier, the training set of normal messages received from one or more vehicles during normal operations of the one or more vehicles;
wherein the training is an unsupervised training;
wherein the one or more encoders comprises a plurality of encoders, each encoder being associated with a distinct arbitration identifier included in the plurality of messages;
wherein the one or more decoders comprises a plurality of decoders, each decoder being associated with the distinct arbitration identifier of the corresponding encoder;
wherein each element of the one or more input vectors is generated based on the payload of a message of the plurality of messages; and wherein generate, using one or more machine learning models, an output vector based on each of the plurality of input vectors comprises, for each input vector of the plurality of input vectors comprises:
- select a corresponding pair of encoder and decoder from, respectively, the plurality of encoders and the plurality of decoders based on the distinct arbitration identifier of the input vector; and
- generate the output vector for the input vector using the selected pair of encoder and decoder.

10. The apparatus of claim 9 wherein
the encoders include a first neural network having a first set of weights;
the decoders include a second neural network having a second set of weights; and
the weights of the encoders and the decoders can be iteratively adjusted to reduce the reconstruction loss for normal messages until the reconstruction loss reaches a minimum.

11. The apparatus of claim 9 wherein the hardware processor is further configured to execute instructions to:
adjust the decoder weight, and the encoder weights to reduce the combined reconstruction loss between training input vectors and training output vectors, wherein the adjustment is based on a gradient descent scheme, in which a degree of adjustment of the weights are based on a gradient of the combined reconstruction loss with respect to the weights.

12. The apparatus of claim 9 wherein
the vehicle includes a network security system which stores information indicative of features of prior normal messages on the CAN bus during a normal operation of a vehicle when the vehicle is not under any kind of network intrusion and there is no malicious message being transmitted on the CAN bus.

13. The apparatus of claim 9 wherein the hardware processor is further configured to execute instructions to:
use dimensionality reduction to generate a representation of the normal messages features of input vectors to form the intermediate vectors, wherein the dimensionality reduction removes noise information.

14. A non-transitory computer readable medium storing instructions that, when executed by a hardware processor, causes the hardware processor to:
receive, at a gateway of a Controller Area Network (CAN) bus on a vehicle and via at least one of a wireless interface or a wired interface of the vehicle, a plurality of messages targeted at one or more electronic control units (ECU) coupled with the CAN bus;
generate one or more input vectors based on the plurality of messages, each of the one or more input vectors having a first number of elements;
generate, using one or more machine learning models, a corresponding output vector based on each of the one or more input vectors, each output vector having the first number of elements;
generate one or more comparison results between each of the one or more input vectors and the corresponding output vector; and
based on the one or more comparison results, perform one of: allowing the plurality of messages to enter the CAN bus or preventing the plurality of messages from entering the CAN bus,
wherein each of the plurality of messages includes an arbitration identifier and a payload,
wherein the one or more input vectors are generated based on both the arbitration identifier and the payload of each of the plurality of messages,
wherein the one or more machine learning models comprise one or more a plurality of encoders and corresponding decoders,
wherein generate, using one or more machine learning models, a corresponding output vector based on each of the one or more input vectors comprises:
- transforming, using the one or more encoders, each of the one or more input vectors to a corresponding intermediate vector, the intermediate vector having a second number of elements, the second number being smaller than the first number; and
- reconstructing, using the one or more corresponding decoders, the one or more output vectors from the corresponding one or more intermediate vectors, wherein the one or more comparison results comprise a combined reconstruction loss between the one or more input vectors and the corresponding one or more output vectors; and
wherein the plurality of messages is prevented from entering the CAN bus based on the combined reconstruction loss exceeding a threshold;
wherein each corresponding pair of encoder and decoder is trained based on a training set of only normal messages having an associated arbitration identifier, the training set of normal messages received from one or more vehicles during normal operations of the one or more vehicles;
wherein the training is an unsupervised training;
wherein the one or more encoders comprises a plurality of encoders, each encoder being associated with a distinct arbitration identifier included in the plurality of messages;
wherein the one or more decoders comprises a plurality of decoders, each decoder being associated with the distinct arbitration identifier of the corresponding encoder;
wherein each element of the one or more input vectors is generated based on the payload of a message of the plurality of messages; and
wherein generate, using one or more machine learning models, an output vector based on each of the plurality of input vectors comprises, for each input vector of the plurality of input vectors comprises:
- select a corresponding pair of encoder and decoder from, respectively, the plurality of encoders and the plurality of decoders based on the distinct arbitration identifier of the input vector; and
- generate the output vector for the input vector using the selected pair of encoder and decoder.

15. The non-transitory computer readable medium of claim 14 wherein
the encoders include a first neural network having a first set of weights;
the decoders include a second neural network having a second set of weights; and
the weights of the encoders and the decoders can be iteratively adjusted to reduce the reconstruction loss for normal messages until the reconstruction loss reaches a minimum.

16. The non-transitory computer readable medium of claim 14 further comprising instructions that, when executed by the hardware processor, cause the hardware processor to:
adjust the decoder weight, and the encoder weights to reduce the combined reconstruction loss between training input vectors and training output vectors, wherein the adjustment is based on a gradient descent scheme, in which a degree of adjustment of the weights are based on a gradient of the combined reconstruction loss with respect to the weights.

17. The non-transitory computer readable medium of claim 14 wherein
the vehicle includes a network security system which stores information indicative of features of prior normal messages on the CAN bus during a normal operation of a vehicle when the vehicle is not under any kind of network intrusion and there is no malicious message being transmitted on the CAN bus.

18. The non-transitory computer readable medium of claim 14 further comprising instructions that, when executed by the hardware processor, cause the hardware processor to:
use dimensionality reduction to generate a representation of the normal messages features of input vectors to form the intermediate vectors, wherein the dimensionality reduction removes noise information.

* * * * *